United States Patent
Zhao et al.

(10) Patent No.: US 9,941,942 B2
(45) Date of Patent: Apr. 10, 2018

(54) METHOD AND DEVICE FOR PROCESSING CHANNEL STATE INFORMATION, USER EQUIPMENT AND EVOLVED NODE B

(71) Applicant: ZTE Corporation, Shenzhen (CN)

(72) Inventors: Jing Zhao, Shenzhen (CN); Yijian Chen, Shenzhen (CN); Jun Xu, Shenzhen (CN); Huahua Xiao, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/114,039

(22) PCT Filed: Jul. 23, 2014

(86) PCT No.: PCT/CN2014/082853
§ 371 (c)(1),
(2) Date: Jul. 25, 2016

(87) PCT Pub. No.: WO2015/109796
PCT Pub. Date: Jul. 30, 2015

(65) Prior Publication Data
US 2016/0344458 A1 Nov. 24, 2016

(30) Foreign Application Priority Data
Jan. 24, 2014 (CN) .......................... 2014 1 0036775

(51) Int. Cl.
*H04B 7/04* (2017.01)
*H04B 7/0456* (2017.01)
(Continued)

(52) U.S. Cl.
CPC ............. *H04B 7/0456* (2013.01); *H04L 1/16* (2013.01); *H04L 25/03898* (2013.01);
(Continued)

(58) Field of Classification Search
CPC .. H04B 7/0456; H04B 7/0626; H04B 7/0452; H04L 25/03898; H04L 1/16; H04L 1/0026
See application file for complete search history.

(56) References Cited

U.S. PATENT DOCUMENTS

2011/0170427 A1* 7/2011 Koivisto ................ H04B 7/022
370/252
2011/0200139 A1* 8/2011 Jen ....................... H04B 7/0639
375/296
(Continued)

FOREIGN PATENT DOCUMENTS

CN 101136718 A 3/2008
CN 101931513 A 12/2010
(Continued)

OTHER PUBLICATIONS

International Search Report for corresponding application PCT/CN2014/082353 filed Jul. 23, 2014; dated Oct. 27, 2014.

*Primary Examiner* — Jean B Corrielus
(74) *Attorney, Agent, or Firm* — Cantor Colburn LLP

(57) ABSTRACT

Provided are a method and device for processing Channel State Information (CSI), User Equipment (UE) and an Evolved Node B (eNodeB). The method includes: storing one or more sets of precoding codebook models the same as those of an eNodeB; determining a precoding codebook model for feeding back CSI; and sending the CSI to the eNodeB by adopting the determined precoding codebook model. By the solution, the problems of difficulty in code word selection and increase of link overhead during application of a codebook-based CSI feedback manner to massive Multi-input Multi-output (MIMO) in the related technology is solved, and the effect of reducing codebook transmission overhead is further achieved.

28 Claims, 15 Drawing Sheets

(51) Int. Cl.
- *H04L 1/16* (2006.01)
- *H04L 25/03* (2006.01)
- *H04L 1/00* (2006.01)
- *H04B 7/0452* (2017.01)
- *H04B 7/06* (2006.01)

(52) U.S. Cl.
CPC .......... *H04B 7/0452* (2013.01); *H04B 7/0626* (2013.01); *H04L 1/0026* (2013.01)

(56) References Cited

U.S. PATENT DOCUMENTS

| | | | |
|---|---|---|---|
| 2011/0261897 A1* | 10/2011 | Jen | H04B 7/0639 375/285 |
| 2012/0250751 A1* | 10/2012 | Kim | H04B 7/0417 375/227 |
| 2012/0270535 A1* | 10/2012 | Chen | H04W 24/10 455/422.1 |
| 2012/0307706 A1* | 12/2012 | Nakano | H04J 11/0033 370/312 |
| 2014/0177746 A1* | 6/2014 | Hsu | H04B 7/0452 375/267 |
| 2015/0131750 A1* | 5/2015 | Xue | H04B 7/0482 375/267 |
| 2015/0304010 A1* | 10/2015 | Zhang | H04B 7/0456 370/329 |

FOREIGN PATENT DOCUMENTS

| | | | |
|---|---|---|---|
| CN | 102237955 A | 11/2011 | |
| CN | 102468947 A | 5/2012 | |

\* cited by examiner

METHOD AND DEVICE FOR PROCESSING CHANNEL STATE INFORMATION, USER EQUIPMENT AND EVOLVED NODE B

FIELD

The present disclosure relates to the field of communication, and in particular to a method and device for processing channel state information (CSI), user equipment (UE) and an evolved node B (eNodeB).

BACKGROUND

In a radio communication system, a sender and a receiver achieve a higher rate by virtue of multiple antennae in a spatial multiplexing manner. Compared with a general spatial multiplexing method, an enhanced technology is that a receiver feeds back channel information to a sender and the sender adopts certain sending precoding technologies according to the obtained channel information, so that transmission performance can be greatly improved. For Single-User Multi-input Multi-output (SU-MIMO), channel feature vector information is directly adopted for precoding. While for Multi-User MIMO (MU-MIMO), relatively accurate channel information is required.

In a Long Term Evolution (LTE) project, a simple single-codebook feedback method is mainly adopted for feedback of channel information, and performance of a sending precoding technology for MIMO is more dependent on accuracy of codebook feedback.

A basic principle of codebook-based channel information quantization feedback is briefly elaborated below.

If limited capacity of a feedback channel is B bps/Hz, the number of available code words is $N=2^B$. A feature vector space of a channel matrix is quantized into a codebook space $\Re = \{F_1, F_2 \ldots F_N\}$. Both a sender and a receiver store or generate in real time the codebook (the codebook is the same at the sender and the receiver). The receiver selects a code word $\hat{F}$ most matched with the channel from $\Re$ according to a certain criterion and the channel matrix H obtained by the receiver, and feeds back a code word index i to the sender. Here, the code word index is called a Precoding Matrix Indicator (PMI). The sender finds the corresponding precoding code word $\hat{F}$ according to the index i, thereby obtaining channel information, $\hat{F}$ representing feature vector information of the channel.

Generally, $\Re$ may further be divided into codebooks corresponding to multiple ranks, and each rank corresponds to multiple code words for quantizing a precoding matrix formed by channel feature vectors under this rank. Since the number of ranks is equal to the number of non-zero feature vectors of a channel, there should be N columns in each code word when the rank is N. Therefore, codebook $\Re$ may be divided into multiple sub-codebooks according to different ranks, as shown in Table 1, which is a schematic table of division of codebook $\Re$ into multiple sub-codebooks according to different ranks in a related technology.

TABLE 1

| $\Re$ Number of layers v (rank) | | | |
|---|---|---|---|
| 1 | 2 | ... | N |
| $\Re_1$ | $\Re_2$ | ... | $\Re_N$ |
| Set of code word vectors with one column | Set of code word matrixes with two columns | ... | Set of code word matrixes with N columns |

In Table 1, $\Re_1$ represents a set of code word vectors with one column, $\Re_2$ represents a set of code word matrixes with two columns, and $\Re_N$ represents a set of code word matrixes with N columns.

A matrix form is adopted for all of code words to be stored when rank>1, wherein this codebook quantization feedback method is adopted for a codebook in LTE protocol. Table 2 is a schematic table of codebooks of 4 LTE downlink sending antennae in the related technology. As shown in Table 2, a precoding codebook and channel information quantization codebook in LTE practically have the same meaning. In order to implement unification, a vector may also be considered as a one-dimensional matrix hereinafter.

TABLE 2

| Code word index $u_n$ | Total number of layers v (RI) | | | |
|---|---|---|---|---|
| | 1 | 2 | 3 | 4 |
| 0  $u_0 = [1 \; -1 \; -1 \; -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1  $u_1 = [1 \; -j \; 1 \; j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2  $u_2 = [1 \; 1 \; -1 \; 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3  $u_3 = [1 \; j \; 1 \; -j]^T$ | $W_3^{\{1\}}$ | $W_3^{\{12\}}/\sqrt{2}$ | $W_3^{\{123\}}/\sqrt{3}$ | $W_3^{\{1234\}}/2$ |
| 4  $u_4 = [1 \; (-1-j)/\sqrt{2} \; -j \; (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5  $u_5 = [1 \; (1-j)/\sqrt{2} \; j \; (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6  $u_6 = [1 \; (1+j)/\sqrt{2} \; -j \; (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7  $u_7 = [1 \; (-1+j)/\sqrt{2} \; j \; (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8  $u_8 = [1 \; -1 \; 1 \; 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9  $u_9 = [1 \; -j \; -1 \; -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10  $u_{10} = [1 \; 1 \; 1 \; -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11  $u_{11} = [1 \; j \; -1 \; j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12  $u_{12} = [1 \; -1 \; -1 \; 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13  $u_{13} = [1 \; -1 \; 1 \; -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14  $u_{14} = [1 \; 1 \; -1 \; -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15  $u_{15} = [1 \; 1 \; 1 \; 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n = I - 2u_n u_n^H / u_n^H u_n$, I is a unit matrix, $W_k^{(j)}$ represents a vector in column j of matrix $W_k$, and $W_k^{(j_1, j_2, \cdots, j_n)}$ represents a matrix formed by columns $j_1, j_2, \ldots, j_n$ of matrix $W_k$.

The principle of a codebook feedback technology in LTE is introduced above, and during practical application, some more specific feedback methods will be further involved.

A feedback granularity of channel information is introduced at first. In an LTE standard, a minimum feedback unit of channel information is subband channel information, one subband consists of a certain number of Resource Blocks (RBs), each RB consists of multiple Resource Elements (REs), and RE is a minimum unit of a time-frequency resource in LTE. A resource representation method for LTE is also adopted for LTE-Advanced (LTE-A). A few subbands may be called multi-subband, while a large number of subbands may be called wideband.

A feedback content related to channel information in LTE is introduced below.

CSI feedback includes: Channel Quality Indication (CQI) information, a PMI and a Rank Indicator (RI). A CSI content that is concerned about most here is PMI information, but the RI and CQI are both feedback contents related to the CSI.

CQI is an index for evaluating quality of a downlink channel. CQI is represented by an integral value of 0~15, which indicate different CQI levels respectively, in protocol 36-213, and different CQI corresponds to respective Modulation and Coding Schemes (MCSs).

An RI is used for describing the number of spatial independent channels, and corresponds to a rank of a channel response matrix. UE is required to feed back RI information in both open loop spatial multiplexing and closed loop spatial multiplexing modes, and is not required to feed back RI information in other modes. The rank of the channel matrix corresponds to the number of layers.

Some mechanisms related to channel information feedback in LTE are further introduced.

There are two feedback manners for uplink channel information in LTE: periodic channel information feedback on a Physical Uplink Control Channel (PUCCH) and non-periodic channel information feedback on a Physical Uplink Shared Channel (PUSCH). The PUCCH is a control channel with higher feedback reliability, but the feedback resource for the PUCCH is precious and feedback overhead is strictly limited. The amount of CSI (including one or more of PMIs, CQI and RIs) fed back once usually should not exceed 11 bits. The PUSCH may provide more CSI feedback resources, but the reliability of feedback on the PUSCH cannot be ensured, moreover, since a data transmission resource is required to be occupied, the CSI feedback on the PUSCH has some influence on transmission of a data service.

Along with rapid development of radio communication technologies, there are more and more radio applications for users, which promote rapid increase of radio data services. It is predicted that data services will be increased at a rate of 1.6 to 2 times every year in the next 10 years, which brings great challenge to the radio access network. A multi-antenna technology is a key technology for dealing with the challenge of explosive increase of radio data services, a current multi-antenna technology supported in 4-Generation (4G) communication only supports a technology for horizontal-dimension beamforming of at most 8 ports, and there is a great potential to further improve system capacity greatly.

A Massive MIMO technology is a key enhanced technology in next-generation communication technologies, and a Massive MIMO system has a main characteristic that: an eNodeB side is configured with a large-scale antenna array including, for example, 100 antennae or even more, multiple users are simultaneously multiplexed under the same frequency by virtue of an MU-MIMO technology during data transmission, and a proportion of the number of the antennae to the number of the multiplexed users is usually kept about 5-10. It can be proved that a correlation coefficient between channels of any two users is exponentially attenuated along with increase of the number of the antennae, no matter whether the channels are strongly-correlated channels in a line-of-sight environment or uncorrelated channels under rich scattering environment. For example, when the eNodeB side is configured with 100 antennae, a correlation coefficient between channels of any two users is approximate to 0, that is, corresponding channels of multiple users are approximately orthogonal. On the other hand, a large array can bring considerable array gains and diversity gains.

For Massive MIMO, due to introduction of massive antennae, a conventional method is that: each antenna sends a Channel State Information-Reference Signal (CSI-RS), UE detects the CSI-RS, obtains a channel matrix corresponding to each transmission resource by channel estimation, obtains the precoding vector of each frequency-domain subband on an optimal baseband and information about the number of optimal transmission layers on a wideband according to the channel matrixes, and performs feedback on the basis of the codebook feedback technology introduced before.

However, such a manner has a big problem during application of Massive MIMO, specifically, code words are difficult to select to cause increase of complexity of the UE and even incapability or high cost in implementation because a codebook adopted for feedback needs to include a very large number of code words. Under such a condition, the overhead for codebook feedback is also high, so that uplink overhead is dramatically increased.

Therefore, application of a codebook-based CSI feedback manner to Massive MIMO may cause the problems of difficulty in code word selection and increase of link overhead in the related technology.

SUMMARY

The embodiments of the present disclosure provide a method and device for processing CSI, UE and an eNodeB, so as to at least solve the problems of difficulty in code word selection and increase of link overhead during application of a codebook-based CSI feedback manner to Massive MIMO in the related technology.

In one aspect, the present disclosure relates to a method for processing CSI. In certain embodiments, the method may include: storing one or more sets of precoding codebook models the same as one or more sets of precoding codebook models stored at an eNodeB; determining a precoding codebook model for feeding back CSI; and sending the CSI to the eNodeB by adopting the determined precoding codebook model.

In certain embodiments, the step that the precoding codebook model for feeding back the CSI is determined may include at least one of that: the precoding codebook model for feeding back the CSI is selected from the one or more sets of precoding codebook models according to a detection result obtained by detection on a current channel; and a precoding codebook model configured by the eNodeB is determined as the precoding codebook model for feeding back the CSI.

In certain embodiments, the step that the CSI is sent to the eNodeB by adopting the determined precoding codebook model may include that: codebook feedback accuracy for feeding back the CSI is determined from stored feedback accuracy level information which is the same as feedback accuracy level information stored at the eNodeB; and the CSI is sent to the eNodeB by adopting the determined precoding codebook model and the determined codebook feedback accuracy.

In certain embodiments, the step that the CSI is sent to the eNodeB by adopting the determined precoding codebook model may include that: the CSI is quantized by adopting the determined precoding codebook model; and codebook index information used for identifying the precoding codebook model and a phase parameter, corresponding to the precoding codebook model, obtained by quantization are sent to the eNodeB.

In certain embodiments, the step that the CSI is sent to the eNodeB by adopting the determined precoding codebook model may include that: the number of feedback parameters for feeding back the CSI is determined from level information of the number of feedback parameters which is the same as level information of the number of feedback parameters which is stored at the eNodeB; and the CSI is sent to the eNodeB by adopting the determined precoding codebook model and the determined number of feedback parameters.

In certain embodiments, the precoding codebook model may include at least one of: $W_{f1}=[v_0\ \alpha v_1\ \beta v_2\ \gamma v_3]^T$ or $W_{f2}=[v'_0\ \alpha v'_1\ \beta v'_2\ \gamma v'_3\ \lambda v'_4\ \mu v'_5\ \kappa v'_6\ \tau v'_7]^T$ identified by a first type of codebook index; $W_{LJ1}=\Lambda \cdot [v_0\ \alpha v_1\ \beta v_2\ \gamma v_3]^T$ or $W_{LJ2}=\Lambda \cdot [v'_0\ \alpha v'_1\ \beta v'_2\ \gamma v'_3\ \lambda v'_4\ \mu v'_5\ \kappa v'_6\ \tau v'_7]$ identified by both the first type of codebook index and a second type of codebook index, wherein basic matrixes $v_0, v_1, v_2$ and $v_3$ are all $v \times (N_t/4)$-dimensional matrixes, basic matrixes $v'_0, v'_1, v'_2, v'_3, v'_4, v'_5, v'_6$ and $v'_7$ are all $v \times (N_t/8)$-dimensional matrixes, $\alpha, \beta, \gamma, \lambda, \mu, \kappa$ and $\tau$ are phase parameters, and are complex numbers, and $N_t$ is a total number of antennae, and is an integer more than or equal to 16; and $v$ represents a total number of layers, and is a positive integer more than or equal to 1 and less than or equal to $N_t$, $\Lambda$ is a diagonal matrix and not all element amplitudes are the same.

In certain embodiments, at least one of the following conditions may further be included: basic matrixes $v_0, v_1, v_2$ and $v_3$ are the same; and basic matrixes $v'_0, v'_1, v'_2, v'_3, v'_4, v'_5, v'_6$ and $v'_7$ are the same.

In certain embodiments, at least one of the following conditions may further be included: for precoding codebook model $W_{f1}=[v_0\ \alpha v_1\ \beta v_2\ \gamma v_3]^T$, basic matrixes $v_0, v_1, v_2$ and $v_3$ are equally divided into K1 groups, and the basic matrixes in each group are the same; for precoding codebook model $W_{f2}=[v'_0\ \alpha v'_1\ \beta v'_2\ \gamma v'_3\ \lambda v'_4\ \mu v'_5\ \kappa v'_6\ \tau v'_7]^T$, basic matrixes $v'_0, v'_1, v'_2, v'_3, v'_4, v'_5, v'_6$ and $v'_7$ are equally divided into K2 groups, and the basic matrixes in each group are the same; for precoding codebook model $W_{LJ1}=\Lambda \cdot [v_0\ \alpha v_1\ \gamma v_2\ \gamma v_3]^T$, basic matrixes $v_0, v_1, v_2$ and $v_3$ are equally divided into K3 groups, and the basic matrixes in each group are the same; and for precoding codebook model $W_{LJ2}=\Lambda \cdot [v'_0\ \alpha v'_1\ \beta v'_2\ \gamma v'_3\ \lambda v'_4\ \mu v'_5\ \kappa v'_6\ \tau v'_7]$, basic matrixes $v'_0, v'_1, v'_2, v'_3, v'_4, v'_5, v'_6$ and $v'_7$ are equally divided into K4 groups, and the basic matrixes in each group are the same, wherein K1, K2, K3 and K4 are all positive integers more than or equal to 1.

In certain embodiments, the diagonal matrix $\Lambda$ may be used for changing amplitudes and phases of ports of $N_t$ antennae.

In certain embodiments, $\Lambda = I + A$, wherein the second type of codebook index may be used for indicating A information, I is a unit matrix and A is any complex matrix.

In certain embodiments, at least one of the following conditions may further be included: for precoding codebook model $W_{f1}=[v_0\ \alpha v_1\ \beta v_2\ \gamma v_3]^T$, phase parameters $\alpha, \beta$ and $\gamma$ form one of the following relationships: $\beta = 2\alpha$ and $\gamma = 3\alpha$; and $\gamma = \alpha \cdot \beta$; and for precoding codebook model $W_{f2}=[v'_0\ \alpha v'_1\ \beta v'_2\ \gamma v'_3\ \lambda v'_4\ \mu v'_5\ \kappa v'_6\ \tau v'_7]^T$, $\alpha, \beta, \gamma, \lambda, \mu, \kappa$ and $\tau$ form one of the following relationships: $\beta = 2\alpha, \gamma = 3\alpha, \lambda = 4\alpha, \mu = 5\alpha, \kappa = 6\alpha$, and $\tau = 7\alpha$; $\beta = 2\alpha, \gamma = 3\alpha, \mu = \lambda \cdot \alpha, \kappa = \lambda \cdot \alpha^2$ and $\tau = \lambda \cdot \alpha^3$; $\lambda = \beta^2, \kappa = \beta^3, \gamma = \alpha \cdot \beta, \mu = \alpha \cdot \beta^2$ and $\mu = \tau \cdot \beta^3$; $\gamma = \alpha \cdot \beta, \mu = \alpha \cdot \lambda$ and $\tau = \alpha \cdot \kappa$; and $\gamma = \alpha \cdot \beta, \mu = \alpha \cdot \lambda$ and $\tau = \alpha \cdot \kappa$.

In certain embodiments, the first type of codebook index may include at least one of the following forms: i, wherein i may be a positive integer more than or equal to 1, and may be used for simultaneously identifying the basic matrixes and phase parameters of the precoding codebook model; i1,i2, wherein i1 and i2 may be positive integers more than or equal to 1, i1 may be used for identifying the basic matrix of the precoding codebook model, and i2 may be used for identifying the phase parameter of the precoding codebook model; and i1,i2,i3, wherein i1, i2 and i3 may be positive integers more than or equal to 1, i1 and i2 may be used for identifying the basic matrix of the precoding codebook model, and i3 may be used for identifying the phase parameter of the precoding codebook model.

In certain embodiments, UE may independently select grouping parameters K1, K2, K3 or K4 of the precoding codebook model according to a PUSCH and a PUCCH.

In another aspect, the present disclosure relates to a method for processing CSI. In certain embodiments, the method may include: storing one or more sets of precoding codebook models the same as one or more sets of precoding codebook models stored at UE; and CSI sent by adopting a precoding codebook model for feeding back the CSI is received from the UE.

In certain embodiments, before the step that the CSI sent by adopting the precoding codebook model for feeding back the CSI is received from the UE, the method may further include that: first indication information is sent to the UE, wherein the first indication information may be used for indicating the precoding codebook model for feeding back the CSI by the UE.

In certain embodiments, before the step that the CSI sent by adopting the precoding codebook model for feeding back the CSI is received from the UE, the method may further include that: second indication information is sent to the UE, wherein the second indication information may be used for indicating codebook feedback accuracy for feeding back the CSI by the UE.

In certain embodiments, before the step that the CSI sent by adopting the precoding codebook model for feeding back the CSI is received from the UE, the method may further include that: third indication information is sent to the UE, wherein the third indication information may be used for indicating the number of feedback parameters for feeding back the CSI by the UE.

In certain embodiments, the precoding codebook model may include at least one of: $W_{f1}=[v_0\ \alpha v_1\ \beta v_2\ \gamma v_3]^T$ or $W_{f2}=[v'_0\ \alpha v'_1\ \beta v'_2\ \gamma v'_3\ \lambda v'_4\ \mu v'_5\ \kappa v'_6\ \tau v'_7]^T$ identified by a first type of codebook index; $W_{LJ1}=\Lambda \cdot [v_0\ \alpha v_1\ \beta v_2\ \gamma v_3]^T$ or $W_{LJ2}=\Lambda \cdot [v'_0\ \alpha v'_1\ \beta v'_2\ \gamma v'_3\ \lambda v'_4\ \mu v'_5\ \kappa v'_6\ \tau v'_7]$ identified by both the first type of codebook index and a second type of codebook index, wherein basic matrixes $v_0, v_1, v_2$ and $v_3$ are all $v \times (N_t/4)$-dimensional matrixes, basic matrixes $v'_0, v'_1, v'_2, v'_3, v'_4, v'_5, v'_6$ and $v'_7$ are all $v \times (N_t/8)$-dimensional matrixes, α, β, γ, λ, μ, κ and τ are phase parameters, and are complex numbers, and $N_t$ is a total number of antennae, and is an integer more than or equal to 16; and ν represents a total number of layers, and is a positive integer more than or equal to 1 and less than or equal to $N_t$, Λ is a diagonal matrix and not all element amplitudes are the same.

In certain embodiments, at least one of the following conditions may further be included: basic matrixes $v_0$, $v_1$, $v_2$ and $v_3$ are the same; and basic matrixes $v'_0$, $v'_1$, $v'_2$, $v'_3$, $v'_4$, $v'_5$, $v'_6$ and $v'_7$ are the same.

In certain embodiments, at least one of the following conditions may further be included: for precoding codebook model $W_{I1}=[v_0 \ \alpha v_1 \ \beta v_2 \ \gamma v_3]^T$, basic matrixes $v_0$, $v_1$, $v_2$ and $v_3$ are equally divided into K1 groups, and the basic matrixes in each group are the same; for precoding codebook model $W_{I2}=[v'_0 \ \alpha v'_1 \ \beta v'_2 \ \gamma v'_3 \ \lambda v'_4 \ \mu v'_5 \ \kappa v'_6 \ \tau v'_7]^T$, basic matrixes $v'_0$, $v'_1$, $v'_2$, $v'_3$, $v'_4$, $v'_5$, $v'_6$ and $v'_7$ are equally divided into K2 groups, and the basic matrixes in each group are the same; for precoding codebook model $W_{LJ1}=\Lambda \cdot [v_0 \ \alpha v_1 \ \gamma v_2 \ \gamma v_3]^T$, basic matrixes $v_0$, $v_1$, $v_2$ and $v_3$ are equally divided into K3 groups, and the basic matrixes in each group are the same; and for precoding codebook model $W_{LJ2}=\Lambda \cdot [v'_0 \ \alpha v'_1 \ \beta v'_2 \ \gamma v'_3 \ \lambda v'_4 \ \mu v'_5 \ \kappa v'_6 \ \tau v'_7]$, basic matrixes $v'_0$, $v'_1$, $v'_2$, $v'_3$, $v'_4$, $v'_5$, $v'_6$ and $v'_7$ are equally divided into K4 groups, and the basic matrixes in each group are the same, wherein K1, K2, K3 and K4 are all positive integers more than or equal to 1.

In certain embodiments, the diagonal matrix Λ may be used for changing amplitudes and phases of ports of $N_t$ antennae.

In certain embodiments, Λ=I+A, wherein the second type of codebook index may be used for indicating A information, I is a unit matrix and A is any complex matrix.

In certain embodiments, at least one of the following conditions may further be included: for precoding codebook model $W_{I1}=[v_0 \ \alpha v_1 \ \beta v_2 \ \gamma v_3]^T$, phase parameters α, β and γ form one of the following relationships: β=2α and γ=3α; and γ=α·β; and for precoding codebook model $W_{I2}=[v'_0 \ \alpha v'_1 \ \beta v'_2 \ \gamma v'_3 \ \lambda v'_4 \ \mu v'_5 \ \kappa v'_6 \ \tau v'_7]^T$, α, β, γ, λ, μ, κ and τ form one of the following relationships: β=2α, γ=3α, λ=4α, μ=5α, κ=6α, and τ=7α; β=2α, γ=3α, μ=λ·α, κ=λ·α² and τ=λ·α³; λ=β², κ=β³, γ=α·β, μ=α·β² and μ=τ·β³; γ=α·β, μ=α·λ and τ=α·κ; and γ=α·β, μ=α·λ and τ=α·κ.

In certain embodiments, the first type of codebook index may include at least one of the following forms: i, wherein i may be a positive integer more than or equal to 1, and may be used for simultaneously identifying the basic matrixes and phase parameters of the precoding codebook model; i1,i2, wherein i1 and i2 may be positive integers more than or equal to 1, i1 may be used for identifying the basic matrix of the precoding codebook model, and i2 may be used for identifying the phase parameter of the precoding codebook model; and i1,i2,i3, wherein i1, i2 and i3 may be positive integers more than or equal to 1, i1 and i2 may be used for identifying the basic matrix of the precoding codebook model, and i3 may be used for identifying the phase parameter of the precoding codebook model.

In certain embodiments, grouping parameters K1, K2, K3 or K4 may be configured for the UE by an eNodeB in a signaling configuration manner.

In certain embodiments, the eNodeB may configure grouping parameters K1, K2, K3 or K4 for the UE according to the number of sending antennae.

In certain embodiments, the eNodeB may independently configure information of grouping parameters K1, K2, K3 or K4 of the precoding codebook model on a PUCCH and a PUSCH to the UE.

In certain embodiments, after the step that the CSI sent by adopting the precoding codebook model for feeding back the CSI is received from the UE, the method may further include that: a downlink transmission manner corresponding to the UE is scheduled for the UE according to a codebook corresponding to the precoding codebook model for feeding back the CSI and the CSI, wherein the downlink transmission manner may include at least one of: an SU-MIMO transmission mode, an MU-MIMO transmission mode, a single-user dynamic handover transmission mode, a multi-user dynamic handover transmission mode and a coordinated multi-point transmission mode.

In yet another aspect, the present disclosure relates to a device for processing CSI. In certain embodiments, the device includes: a first storage module, configured to store one or more sets of precoding codebook models the same as one or more sets of precoding codebook models stored at an eNodeB; a first determination module, configured to determine a precoding codebook model for feeding back CSI; and a first sending module, configured to send the CSI to the eNodeB by adopting the determined precoding codebook model.

In certain embodiments, first determination module may include at least one of: a first selection unit, configured to select the precoding codebook model for feeding back the CSI from the one or more sets of precoding codebook models according to a detection result obtained by detection on a current channel; and a first determination unit, configured to determine a precoding codebook model configured by the eNodeB as the precoding codebook model for feeding back the CSI.

In certain embodiments, the first sending module may include: a second determination unit, configured to determine codebook feedback accuracy for feeding back the CSI from stored feedback accuracy level information which is the same as feedback accuracy level information stored at the eNodeB; and a first sending unit, configured to send the CSI to the eNodeB by adopting the determined precoding codebook model and the determined codebook feedback accuracy.

In certain embodiments, the first sending module may include: a first quantization unit, configured to quantize the CSI by adopting the determined precoding codebook model; and a second sending unit, configured to send codebook index information used for identifying the precoding codebook model and a phase parameter, corresponding to the precoding codebook model, obtained by quantization to the evolved Node B.

In certain embodiments, the first sending module may include: a third determination unit, configured to determine the number of feedback parameters for feeding back the CSI from level information of the number of feedback parameters which is the same as level information of the number of feedback parameters which is stored at the eNodeB; and a second sending unit, configured to send the CSI to the eNodeB by adopting the determined precoding codebook model and the determined number of feedback parameters.

In certain embodiments, the precoding codebook model may include at least one of: $W_{I1}=[v_0 \ \alpha v_1 \ \beta v_2 \ \gamma v_3]^T$ or $W_{I2}=[v'_0 \ \alpha v'_1 \ \beta v'_2 \ \gamma v'_3 \ \lambda v'_4 \ \mu v'_5 \ \kappa v'_6 \ \tau v'_7]^T$ identified by a first type of codebook index; $W_{LJ1}=\Lambda \cdot [v_0 \ \alpha v_1 \ \beta v_2 \ \gamma v_3]^T$ or $W_{LJ2}=\Lambda \cdot [v'_0 \ \alpha v'_1 \ \beta v'_2 \ \gamma v'_3 \ \lambda v'_4 \ \mu v'_5 \ \kappa v'_6 \ \tau v'_7]$ identified by both the first type of codebook index and a second type of codebook index, wherein basic matrixes $v_0$, $v_1$, $v_2$ and $v_3$ are all $v \times (N_t/4)$-dimensional matrixes, basic matrixes $v'_0$, $v'_1$, $v'_2$, $v'_3$, $v'_4$, $v'_5$, $v'_6$ and $v'_7$ are all $v \times (N_t/8)$-dimensional matrixes, α, β, γ, λ, μ, κ and τ are phase parameters, and are complex numbers, and $N_t$ is a total number of antennae, and is an integer more than or equal to 16; and ν represents a total number of layers, and is a positive integer more than or equal to 1 and less than or equal to $N_t$, Λ is a diagonal matrix and not all element amplitudes are the same.

In a further aspect, the present disclosure relates to a UE. In certain embodiments, the UE may include the device mentioned in any of the abovementioned items.

In yet another aspect, the present disclosure relates to a device for processing CSI. In certain embodiments, the device may include: a second storage module, configured to store one or more sets of precoding codebook models the same as one or more sets of precoding codebook models stored at UE; and a first receiving module, configured to receive CSI sent by adopting a precoding codebook model for feeding back the CSI from the UE.

In certain embodiments, the device may further include: a second sending module, configured to send first indication information to the UE, wherein the first indication information may be used for indicating the precoding codebook model for feeding back the CSI by the UE.

In certain embodiments, the device may further include: a third sending module, configured to send second indication information to the UE, wherein the second indication information may be used for indicating codebook feedback accuracy for feeding back the CSI by the UE.

In certain embodiments, the device may further include: a fourth sending module, configured to send third indication information to the UE, wherein the third indication information may be used for indicating the number of feedback parameters for feeding back the CSI by the UE.

In certain embodiments, the precoding codebook model may include at least one of: $W_{I1}=[v_0 \ \alpha v_1 \ \beta v_2 \ \gamma v_3]^T$ or $W_{I2}=[v'_0 \ \alpha v'_1 \ \beta v'_2 \ \gamma v'_3 \ \lambda v'_4 \ \mu v'_5 \ \kappa v'_6 \ \tau v'_7]^T$ identified by a first type of codebook index; $W_{IJ1}=\Lambda \cdot [v_0 \ \alpha v_1 \ \beta v_2 \ \gamma v_3]^T$ or $W_{IJ2}=\Lambda \cdot [v'_0 \ \alpha v'_1 \ \beta v'_2 \ \gamma v'_3 \ \lambda v'_4 \ \mu v'_5 \ \kappa v'_6 \ \tau v'_7]$ identified by both the first type of codebook index and a second type of codebook index, wherein basic matrixes $v_0$, $v_1$, $v_2$ and $v_3$ are all $\nu \times (N_t/4)$-dimensional matrixes, basic matrixes $v'_0$, $v'_1$, $v'_2$, $v'_3$, $v'_4$, $v'_5$, $v'_6$ and $v'_7$ are all $\nu \times (N_t/8)$-dimensional matrixes, α, β, γ, λ, μ, κ and τ are phase parameters, and are complex numbers, and $N_t$ is a total number of antennae, and is an integer more than or equal to 16; and ν represents a total number of layers, and is a positive integer more than or equal to 1 and less than or equal to $N_t$, Λ is a diagonal matrix and not all element amplitudes are the same.

In certain embodiments, the device may further include: a scheduling module, configured to schedule, for the UE, a downlink transmission manner corresponding to the UE according to a codebook corresponding to the precoding codebook model for feeding back the CSI and the CSI, wherein the downlink transmission manner may include at least one of: an SU-MIMO transmission mode, an MU-MIMO transmission mode, a single-user dynamic handover transmission mode, a multi-user dynamic handover transmission mode and a coordinated multi-point transmission mode.

In another aspect, the present disclosure relates to an eNodeB. In certain embodiments, the eNodeB may include the device mentioned in any one of the abovementioned items.

According to the embodiments of the present disclosure, one or more sets of precoding codebook models the same as those of the eNodeB are stored; the precoding codebook model for feeding back the CSI is determined; and the CSI is sent to the eNodeB by adopting the determined precoding codebook model. By virtue of the technical solution, the problems of difficulty in code word selection and increase of link overhead during application of the codebook-based CSI feedback manner to Massive MIMO in the related technology is solved, and the effect of reducing codebook transmission overhead is further achieved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION

The present disclosure will be described below with reference to the drawings and embodiments in detail. It is important to note that the embodiments in the present disclosure and characteristics in the embodiments may be combined under the condition of no conflicts.

Figure 1:
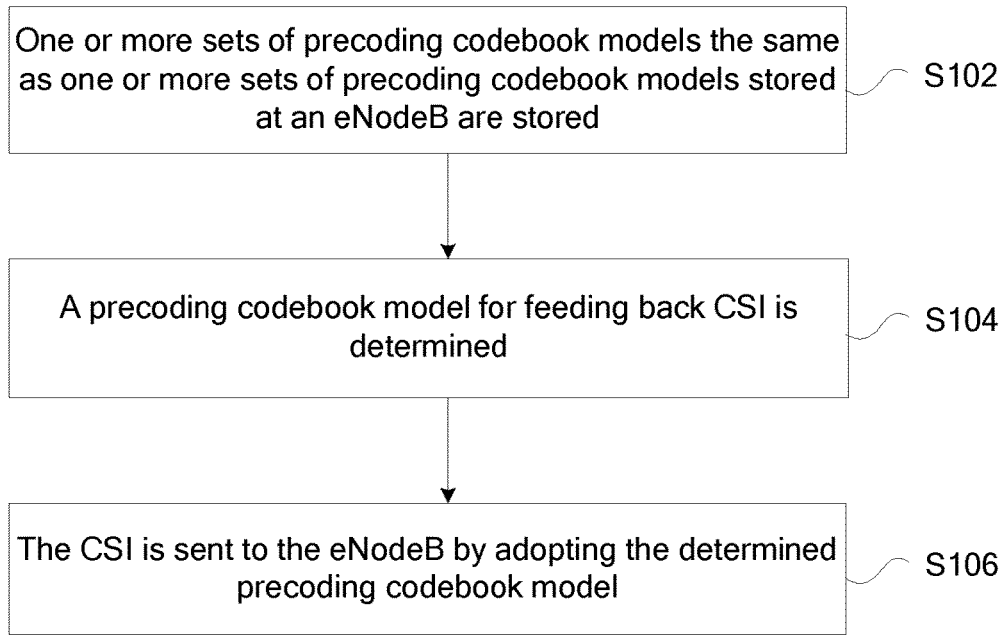
FIG. 1 is a flowchart of a method for processing CSI according to certain embodiments of the present disclosure.

The embodiment provides a method for processing CSI. FIG. 1 is a flowchart of a first method for processing CSI according to an embodiment of the present disclosure, and as shown in FIG. 1, the flow includes the following steps:

Step S102: one or more sets of precoding codebook models the same as one or more sets of precoding codebook models stored at an eNodeB are stored;

Step S104: a precoding codebook model for feeding back CSI is determined; and

Step S106: the CSI is sent to the eNodeB by adopting the determined precoding codebook model.

By the steps, for UE side, the CSI is sent in a precoding codebook model manner. Compared with application of a codebook-based CSI feedback manner to Massive MIMO in the related technology, such a manner has the advantages that the problems of difficulty in code word selection and link overhead increase in the related technology are effectively solved, and the effect of reducing codebook transmission overhead is further achieved.

The step of determining the precoding codebook model for feeding back the CSI may include multiple manners, and for example, may include at least one of that: the precoding codebook model for feeding back the CSI is selected from the one or more sets of precoding codebook models according to a detection result obtained by detection on a current channel; and a precoding codebook model configured by the eNodeB is determined as the precoding codebook model for feeding back the CSI.

When the CSI is sent to the eNodeB by adopting the determined precoding codebook model, multiple manners may be adopted according to different feedback forms. For example, codebook feedback accuracy for feeding back the CSI may be determined from stored feedback accuracy level information which is the same as feedback accuracy level information stored at the eNodeB, and then the CSI is sent to the eNodeB by adopting the determined precoding codebook model and the determined codebook feedback accuracy. For another example, the number of feedback parameters for feeding back the CSI may be determined from level information of the number of feedback parameters which is the same as level information of the number of feedback parameters which is stored at the eNodeB, and then the CSI is sent to the eNodeB by adopting the determined precoding codebook model and the determined number of feedback parameters. For a third example, the CSI may be quantized by adopting the determined precoding codebook model, and then codebook index information used for identifying the precoding codebook model and a phase parameter, corresponding to the precoding codebook model, obtained by quantization are sent to the evolved Node B.

In certain embodiments, the precoding codebook model may include at least one of: $W_{f1}=[v_0 \ \alpha v_1 \ \beta v_2 \ \gamma v_3]^T$ or $W_{f2}=[v'_0 \ \alpha v'_1 \ \beta v'_2 \ \gamma v'_3 \ \lambda v'_4 \ \mu v'_5 \ \kappa v'_6 \ \tau v'_7]^T$ identified by a first type of codebook index; $W_{LJ1}=\Lambda \cdot [v_0 \ \alpha v_1 \ \beta v_2 \ \gamma v_3]^T$ or $W_{LJ2}=\Lambda \cdot [v'_0 \ \alpha v'_1 \ \beta v'_2 \ \gamma v'_3 \ \lambda v'_4 \ \mu v'_5 \ \kappa v'_6 \ \tau v'_7]$ identified by both the first type of codebook index and a second type of codebook index, wherein basic matrixes $v_0, v_1, v_2$ and $v_3$ are all $v \times (N_t/4)$-dimensional matrixes, basic matrixes $v'_0, v'_1, v'_2, v'_3, v'_4, v'_5, v'_6$ and $v'_7$ are all $v \times (N_t/8)$-dimensional matrixes, $\alpha, \beta, \gamma, \lambda, \mu, \kappa$ and $\tau$ are phase parameters, and are complex numbers, and $N_t$ is a total number of antennae, and is an integer more than or equal to 16; and $v$ represents a total number of layers, and is a positive integer more than or equal to 1 and less than or equal to $N_t$, $\Lambda$ is a diagonal matrix and not all element amplitudes are the same.

In the embodiment, basic matrixes $v_0, v_1, v_2$ and $v_3$ are the same; and basic matrixes $v'_0, v'_1, v'_2, v'_3, v'_4, v'_5, v'_6$ and $v'_7$ are the same.

For precoding codebook model $W_{f1}=[v_0 \ \alpha v_1 \ \beta v_2 \ \gamma v_3]^T$, basic matrixes $v_0, v_1, v_2$ and $v_3$ are equally divided into K1 groups, and the basic matrixes in each group are the same; for precoding codebook model $W_{f2}=[v'_0 \ \alpha v'_1 \ \beta v'_2 \ \gamma v'_3 \ \lambda v'_4 \ \mu v'_5 \ \kappa v'_6 \ \tau v'_7]^T$, basic matrixes $v'_0, v'_1, v'_2, v'_3, v'_4, v'_5, v'_6$ and $v'_7$ are equally divided into K2 groups, and the basic matrixes in each group are the same; for precoding codebook model $W_{LJ1}=\Lambda \cdot [v_0 \ \alpha v_1 \ \gamma v_2 \ \gamma v_3]^T$, basic matrixes $v_0, v_1, v_2$ and $v_3$ are equally divided into K3 groups, and the basic matrixes in each group are the same; and for precoding codebook model $W_{LJ2}=\Lambda \cdot [v'_0 \ \alpha v'_1 \ \beta v'_2 \ \gamma v'_3 \ \lambda v'_4 \ \mu v'_5 \ \kappa v'_6 \ \tau v'_7]$, basic matrixes $v'_0, v'_1, v'_2, v'_3, v'_4, v'_5, v'_6$ and $v'_7$ are equally divided into K4 groups, and the basic matrixes in each group are the same, wherein K1, K2, K3 and K4 are all positive integers more than or equal to 1.

In the embodiment, the diagonal matrix $\Lambda$ is used for changing amplitudes and phases of ports of $N_t$ antennae. $\Lambda=I+A$, wherein the second type of codebook index is used for indicating A information, I is a unit matrix and A is any complex matrix.

For precoding codebook model $W_{f1}=[v_0 \ \alpha v_1 \ \beta v_2 \ \gamma v_3]^T$, phase parameters $\alpha, \beta$ and $\gamma$ form one of the following relationships: $\beta=2\alpha$ and $\gamma=3\alpha$; and $\gamma=\alpha \cdot \beta$; and for precoding codebook model $W_{f2}=[v'_0 \ \alpha v'_1 \ \beta v'_2 \ \gamma v'_3 \ \lambda v'_4 \ \mu v'_5 \ \kappa v'_6 \ \tau v'_7]^T$, $\alpha, \beta, \gamma, \lambda, \mu, \kappa$ and $\tau$ form one of the following relationships: $\beta=2\alpha, \gamma=3\alpha, \lambda=4\alpha, \mu=5\alpha, \kappa=6\alpha$, and $\tau=7\alpha$; $\beta=2\alpha, \gamma=3\alpha, \mu=\lambda \cdot \alpha, \kappa=\lambda \cdot \alpha^2$ and $\tau=\lambda \cdot \alpha^3$; $\lambda=\beta^2, \kappa=\beta^3, \gamma=\alpha \cdot \beta, \mu=\alpha \cdot \beta^2$ and $\mu=\tau \cdot \beta^3$; $\gamma=\alpha \cdot \beta, \mu=\alpha \cdot \lambda$ and $\tau=\alpha \cdot \kappa$; and $\gamma=\alpha \cdot \beta, \mu=\alpha \cdot \lambda$ and $\tau=\alpha \cdot \kappa$.

It is important to point out that the first type of codebook index includes at least one of the following forms: i, wherein i may be a positive integer more than or equal to 1, and may be used for simultaneously identifying the basic matrixes and phase parameters of the precoding codebook model; i1,i2, wherein i1 and i2 may be positive integers more than or equal to 1, i1 may be used for identifying the basic matrix of the precoding codebook model, and i2 may be used for identifying the phase parameter of the precoding codebook model; and i1,i2,i3, wherein i1, i2 and i3 may be positive integers more than or equal to 1, i1 and i2 may be used for identifying the basic matrix of the precoding codebook model, and i3 may be used for identifying the phase parameter of the precoding codebook model.

In the embodiment, multiple manners may be adopted for selection of the grouping parameter, and for example, UE independently selects grouping parameters K1, K2, K3 or K4 of the precoding codebook model according to a PUSCH and a PUCCH.

Figure 2:
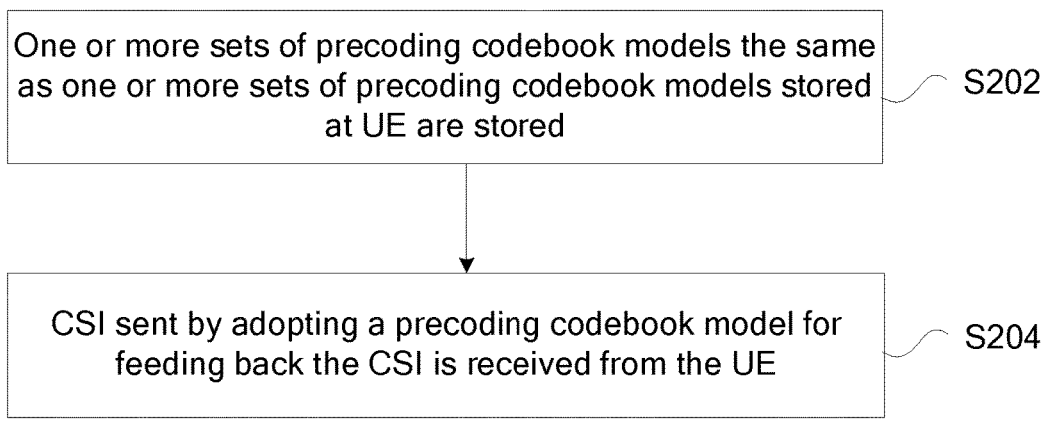
FIG. 2 is a flowchart of another method for processing CSI according to certain embodiments of the present disclosure.

The embodiment further provides a method for processing CSI. FIG. 2 is a flowchart of a second method for processing CSI according to an embodiment of the present disclosure, and as shown in FIG. 2, the flow includes the following steps:

Step S202: one or more sets of precoding codebook models the same as one or more sets of precoding codebook models stored at UE are stored; and Step S204: CSI sent by adopting a precoding codebook model for feeding back the CSI is received from the UE.

By the steps, for an eNodeB side, the CSI is sent in a precoding codebook model manner. Compared with application of a codebook-based CSI feedback manner to Massive MIMO in the related technology, such a manner has the advantages that the problems of difficulty in code word selection and link overhead increase in the related technology are effectively solved, and the effect of reducing codebook transmission overhead is further achieved.

In an exemplary embodiment, different processing may be correspondingly executed according to different contents which are fed back. For example, before the CSI sent by adopting the precoding codebook model for feeding back the CSI is received from the UE, first indication information may be sent to the UE, wherein the first indication information may be used for indicating the precoding codebook model for feeding back the CSI by the UE. For another example, before the CSI sent by adopting the precoding codebook model for feeding back the CSI is received from the UE, second indication information may also be sent to the UE, wherein the second indication information may be used for indicating codebook feedback accuracy for feeding back the CSI by the UE. For a third example, before the CSI sent by adopting the precoding codebook model for feeding back the CSI is received from the UE, the method further includes that: third indication information is sent to the UE, wherein the third indication information may be used for indicating the number of feedback parameters for feeding back the CSI by the UE.

In the embodiment, the precoding codebook model may include at least one of: $W_{I1}=[v_0\ \alpha v_1\ \beta v_2\ \gamma v_3]^T$ or $W_{I2}=[v'_0\ \alpha v'_1\ \beta v'_2\ \gamma v'_3\ \lambda v'_4\ \mu v'_5\ \kappa v'_6\ \tau v'_7]^T$ identified by a first type of codebook index; $W_{I,I1}=\Lambda\cdot[v_0\ \alpha v_1\ \beta v_2\ \gamma v_3]^T$ or $W_{I,I2}=\Lambda\cdot[v'_0\ \alpha v'_1\ \beta v'_2\ \gamma v'_3\ \lambda v'_4\ \mu v'_5\ \kappa v'_6\ \tau v'_7]$ identified by both the first type of codebook index and a second type of codebook index, wherein basic matrixes $v_0, v_1, v_2$ and $v_3$ are all $v\times(N_t/4)$-dimensional matrixes, basic matrixes $v'_0, v'_1, v'_2, v'_3, v'_4, v'_5, v'_6$ and $v'_7$ are all $v\times(N_t/8)$-dimensional matrixes, $\alpha, \beta, \gamma, \lambda, \mu, \kappa$ and $\tau$ are phase parameters, and are complex numbers, and $N_t$ is a total number of antennae, and is an integer more than or equal to 16; and $v$ represents a total number of layers, and is a positive integer more than or equal to 1 and less than or equal to $N_t$, $\Lambda$ is a diagonal matrix and not all element amplitudes are the same.

Basic matrixes $v_0, v_1, v_2$ and $v_3$ are the same; and basic matrixes $v'_0, v'_1, v'_2, v'_3, v'_4, v'_5, v'_6$ and $v'_7$ are the same.

For precoding codebook model $W_{I1}=[v_0\ \alpha v_1\ \beta v_2\ \gamma v_3]^T$, basic matrixes $v_0, v_1, v_2$ and $v_3$ are equally divided into K1 groups, and the basic matrixes in each group are the same; for precoding codebook model $W_{I2}=[v'_0\ \alpha v'_1\ \beta v'_2\ \gamma v'_3\ \lambda v'_4\ \mu v'_5\ \kappa v'_6\ \tau v'_7]^T$, basic matrixes $v'_0, v'_1, v'_2, v'_3, v'_4, v'_5, v'_6$ and $v'_7$ are equally divided into K2 groups, and the basic matrixes in each group are the same; for precoding codebook model $W_{I,I1}=\Lambda\cdot[v_0\ \alpha v_1\ \gamma v_2\ \gamma v_3]^T$, basic matrixes $v_0, v_1, v_2$ and $v_3$ are equally divided into K3 groups, and the basic matrixes in each group are the same; and for precoding codebook model $W_{I,I2}=\Lambda\cdot[v'_0\ \alpha v'_1\ \beta v'_2\ \gamma v'_3\ \lambda v'_4\ \mu v'_5\ \kappa v'_6\ \tau v'_7]$, basic matrixes $v'_0, v'_1, v'_2, v'_3, v'_4, v'_5, v'_6$ and $v'_7$ are equally divided into K4 groups, and the basic matrixes in each group are the same, wherein K1, K2, K3 and K4 are all positive integers more than or equal to 1.

The diagonal matrix $\Lambda$ is used for changing amplitudes and phases of ports of $N_t$ antennae. $\Lambda=I+A$, wherein the second type of codebook index is used for indicating A information, I is a unit matrix and A is any complex matrix.

For precoding codebook model $W_{I1}=[v_0\ \alpha v_1\ \beta v_2\ \gamma v_3]^T$, phase parameters $\alpha$, $\beta$ and $\gamma$ form one of the following relationships: $\beta=2\alpha$ and $\gamma=3\alpha$; and $\gamma=\alpha\cdot\beta$; and for precoding codebook model $W_{I2}=[v'_0\ \alpha v'_1\ \beta v'_2\ \gamma v'_3\ \lambda v'_4\ \mu v'_5\ \kappa v'_6\ \tau v'_7]^T$, $\alpha, \beta, \gamma, \lambda, \mu, \kappa$ and $\tau$ form one of the following relationships: $\beta=2\alpha, \gamma=3\alpha, \lambda=4\alpha, \mu=5\alpha, \kappa=6\alpha,$ and $\tau=7\alpha$; $\beta=2\alpha, \gamma=3\alpha, \mu=\lambda\cdot\alpha, \kappa=\lambda\cdot\alpha^2$ and $\tau=\lambda\cdot\alpha^3$; $\lambda=\beta^2, \kappa=\beta^3, \gamma=\alpha\cdot\beta, \mu=\alpha\cdot\beta^2$ and $\mu=\tau\cdot\beta^3$; $\gamma=\alpha\cdot\beta, \mu=\alpha\cdot\lambda$ and $\tau=\alpha\cdot\kappa$; and $\gamma=\alpha\cdot\beta, \mu=\alpha\cdot\lambda$ and $\tau=\alpha\cdot\kappa$.

In the embodiment, the first type of codebook index may adopt multiple forms, and for example, may include at least one of the following forms: i, wherein i may be a positive integer more than or equal to 1, and may be used for simultaneously identifying the basic matrixes and phase parameters of the precoding codebook model; i1,i2, wherein i1 and i2 may be positive integers more than or equal to 1, i1 may be used for identifying the basic matrix of the precoding codebook model, and i2 may be used for identifying the phase parameter of the precoding codebook model; and i1,i2,i3, wherein i1, i2 and i3 may be positive integers more than or equal to 1, i1 and i2 may be used for identifying the basic matrix of the precoding codebook model, and i3 may be used for identifying the phase parameter of the precoding codebook model.

It is important to note that grouping parameters K1, K2, K3 or K4 may be configured for the UE by an eNodeB in a signaling configuration manner, and in an exemplary embodiment, the eNodeB may configure grouping parameters K1, K2, K3 or K4 for the UE according to the number of sending antennae. In addition, the eNodeB may also independently configure information of grouping parameters K1, K2, K3 or K4 of the precoding codebook model on a PUCCH and a PUSCH to the UE.

In an exemplary embodiment, after the CSI sent by adopting the precoding codebook model for feeding back the CSI is received from the UE, a downlink transmission manner corresponding to the UE may also be scheduled for the UE according to a codebook corresponding to the precoding codebook model for feeding back the CSI and the CSI, wherein the downlink transmission manner includes at least one of: an SU-MIMO transmission mode, an MU-MIMO transmission mode, a single-user dynamic handover transmission mode, a multi-user dynamic handover transmission mode and a coordinated multi-point transmission mode.

The embodiment further provides a device for processing CSI, which is configured to implement the abovementioned embodiments and exemplary implementation modes, and what has been described will not be elaborated. For example, term "module", used below, is a combination of software and/or hardware capable of realizing a preset function. The device described in the following embodiment is preferably implemented by software, but implementation of the device with hardware or the combination of software and hardware is also possible and conceivable.

Figure 3:
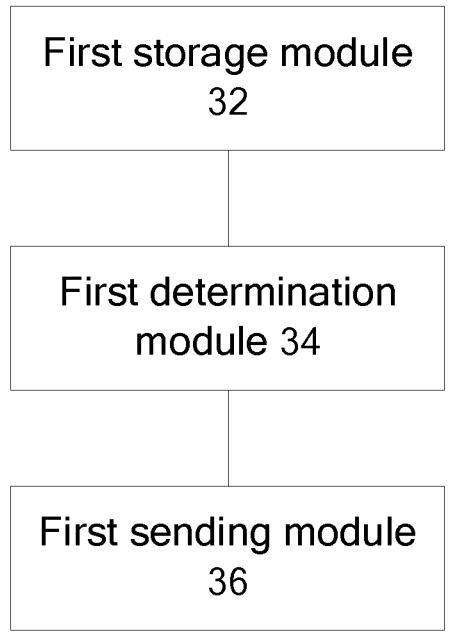
FIG. 3 is a structure block diagram of a device for processing CSI according to certain embodiments of the present disclosure.

FIG. 3 is a structure block diagram of a first device for processing CSI according to an embodiment of the present disclosure, and as shown in FIG. 3, the device includes a first storage module 32, a first determination module 34 and a first sending module 36. The device will be described below.

The first storage module 32 is configured to store one or more sets of precoding codebook models the same as one or more sets of precoding codebook models stored at an eNodeB; the first determination module 34 is coupled with the first storage module 32, and is configured to determine a precoding codebook model for feeding back CSI; and the first sending module 36 is coupled with the first determination module 34, and is configured to send the CSI to the eNodeB by adopting the determined precoding codebook model.

Figure 4:
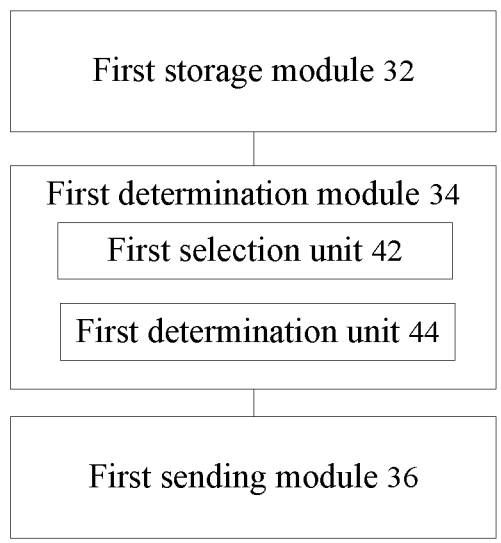
FIG. 4 is an exemplary structure block diagram of a determination module in the device for processing CSI according to certain embodiments of the present disclosure.

FIG. 4 is an exemplary structure block diagram of a first determination module 34 in a first device for processing CSI according to an embodiment of the present disclosure, and as shown in FIG. 4, the first determination module 34 includes at least one of: a first selection unit 42 and a first determination unit 44. The first determination module 34 will be described below.

The first selection unit 42 is configured to select the precoding codebook model for feeding back the CSI from the one or more sets of precoding codebook models according to a detection result obtained by detection on a current channel; and the first determination unit 44 is configured to determine a precoding codebook model configured by the eNodeB as the precoding codebook model for feeding back the CSI.

Figure 5:
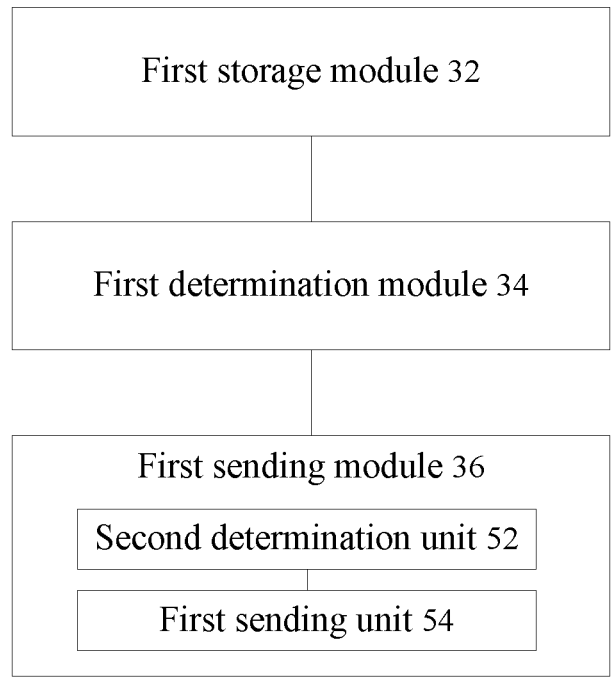
FIG. 5 is an exemplary structure block diagram of a sending module in the device for processing CSI according to certain embodiments of the present disclosure.

FIG. 5 is a first exemplary structure block diagram of a first sending module 36 in a first device for processing CSI according to an embodiment of the present disclosure, and as shown in FIG. 5, the first sending module 36 includes a second determination unit 52 and a first sending unit 54. The first sending module 36 will be described below.

The second determination unit 52 is configured to determine codebook feedback accuracy for feeding back the CSI from stored feedback accuracy level information which is the same as feedback accuracy level information stored at the eNodeB; and the first sending unit 54 is coupled with the second determination unit 52, and is configured to send the CSI to the eNodeB by adopting the determined precoding codebook model and the determined codebook feedback accuracy.

Figure 6:
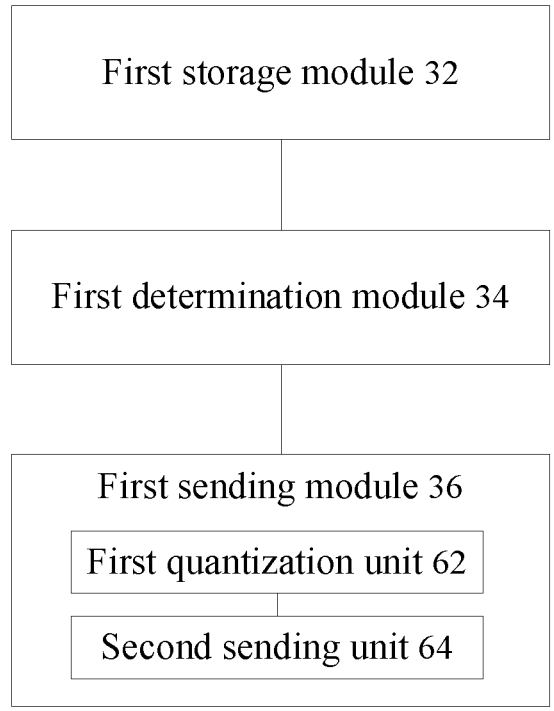
FIG. 6 is another exemplary structure block diagram of a first sending module in the device for processing CSI according to certain embodiments of the present disclosure.

FIG. 6 is a second exemplary structure block diagram of a first sending module 36 in a first device for processing CSI according to an embodiment of the present disclosure, and as shown in FIG. 6, the first sending module 36 includes a first quantization unit 62 and a second sending unit 64. The first sending module 36 will be described below.

The first quantization unit 62 is configured to quantize the CSI by adopting the determined precoding codebook model; and the second sending unit 64 is coupled with the first quantization unit 62, and is configured to send codebook index information used for identifying the precoding codebook model and a phase parameter, corresponding to the precoding codebook model, obtained by quantization to the evolved Node B.

Figure 7:
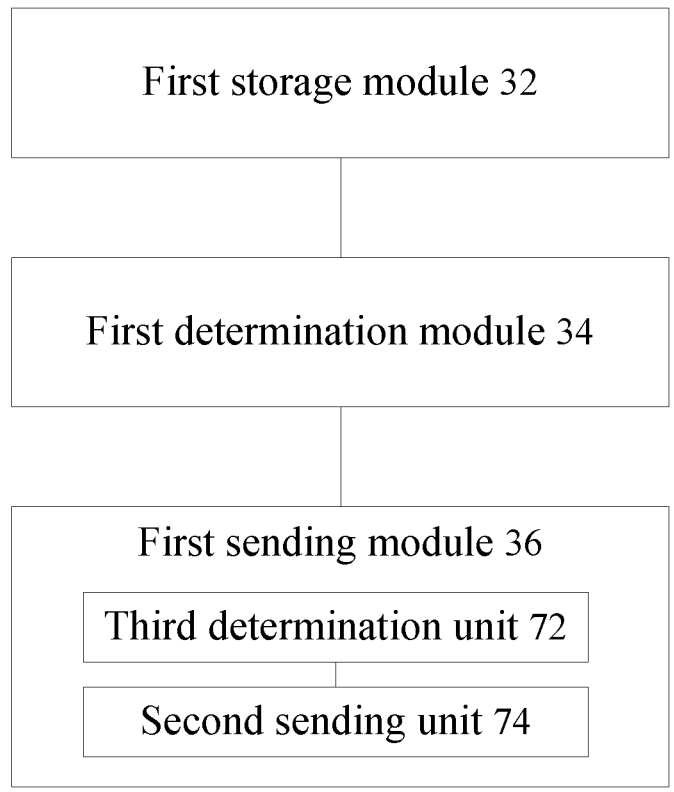
FIG. 7 is yet another exemplary structure block diagram of a first sending module in the device for processing CSI according to an embodiment of the present disclosure.

FIG. 7 is a third exemplary structure block diagram of a first sending module 36 in a first device for processing CSI according to an embodiment of the present disclosure, and as shown in FIG. 7, the first sending module 36 includes a third determination unit 72 and a second sending unit 74. The first sending module 36 will be described below.

The third determination unit 72 is configured to determine the number of feedback parameters for feeding back the CSI from level information of the number of feedback parameters which is the same as level information of the number of feedback parameters which is stored at the eNodeB; and the second sending unit 74 is coupled with the third determination unit 72, and is configured to send the CSI to the eNodeB by adopting the determined precoding codebook model and the determined number of feedback parameters.

In an exemplary embodiment, the precoding codebook model may include at least one of: $W_{I1}=[v_0\ \alpha v_1\ \beta v_2\ \gamma v_3]^T$ or $W_{I2}=[v'_0\ \alpha v'_1\ \beta v'_2\ \gamma v'_3\ \lambda v'_4\ \mu v'_5\ \kappa v'_6\ \tau v'_7]^T$ identified by a first type of codebook index; $W_{I,I1}=\Lambda \cdot [v_0\ \alpha v_1\ \beta v_2\ \gamma v_3]^T$ or $W_{I,I2}=\Lambda \cdot [v'_0\ \alpha v'_1\ \beta v'_2\ \gamma v'_3\ \lambda v'_4\ \mu v'_5\ \kappa v'_6\ \tau v'_7]$ identified by both the first type of codebook index and a second type of codebook index, wherein basic matrixes $v_0$, $v_1$, $v_2$ and $v_3$ are all $v\times(N_t/4)$-dimensional matrixes, basic matrixes $v'_0$, $v'_1$, $v'_2$, $v'_3$, $v'_4$, $v'_5$, $v'_6$ and $v'_7$ are all $v\times(N_t/8)$-dimensional matrixes, $\alpha$, $\beta$, $\gamma$, $\lambda$, $\mu$, $\kappa$ and $\tau$ are phase parameters, and are complex numbers, and $N_t$ is a total number of antennae, and is an integer more than or equal to 16; and $v$ represents a total number of layers, and is a positive integer more than or equal to 1 and less than or equal to $N_t$, $\Lambda$ is a diagonal matrix and not all element amplitudes are the same.

Figure 8:
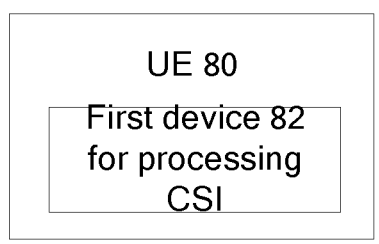
FIG. 8 is a structure block diagram of UE according to certain embodiments of the present disclosure.

FIG. 8 is a structure block diagram of UE according to an embodiment of the present disclosure, and as shown in FIG. 8, the UE 80 includes the first device for processing CSI 82 mentioned in any one of the abovementioned items.

Figure 9:
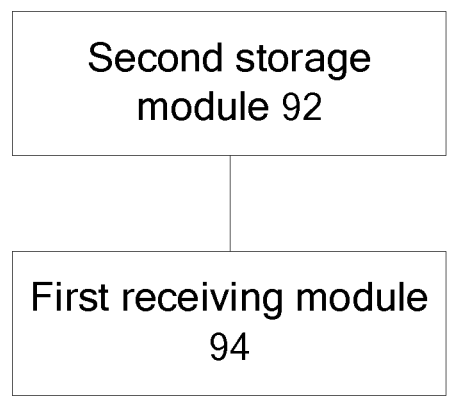
FIG. 9 is a structure block diagram of another device for processing CSI according to certain embodiments of the present disclosure.

FIG. 9 is a structure block diagram of a second device for processing CSI according to an embodiment of the present disclosure, and as shown in FIG. 9, the device includes a second storage module 92 and a first receiving module 94. The device will be described below.

The second storage module 92 is configured to store one or more sets of precoding codebook models the same as one or more sets of precoding codebook models stored at UE; and the first receiving module 94 is coupled with the second storage module 92, and is configured to receive CSI sent by adopting a precoding codebook model for feeding back the CSI from the UE.

Figure 10:
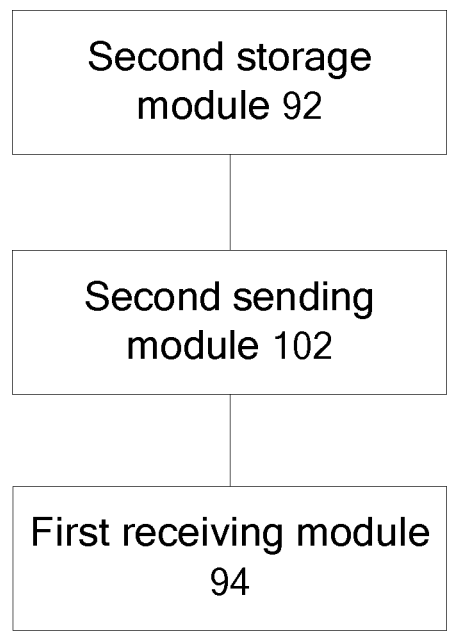
FIG. 10 is an exemplary structure block diagram of the device for processing CSI according to certain embodiments of the present disclosure.

FIG. 10 is a first exemplary structure block diagram of a second device for processing CSI according to an embodiment of the present disclosure, and as shown in FIG. 10, the device further includes, besides all the modules shown in FIG. 9, a second sending module 102. The second sending module 102 will be described below.

The second sending module 102 is coupled with the second storage module 92 and the first receiving module 94, and is configured to send first indication information to the UE, wherein the first indication information may be used for indicating the precoding codebook model for feeding back the CSI by the UE.

Figure 11:
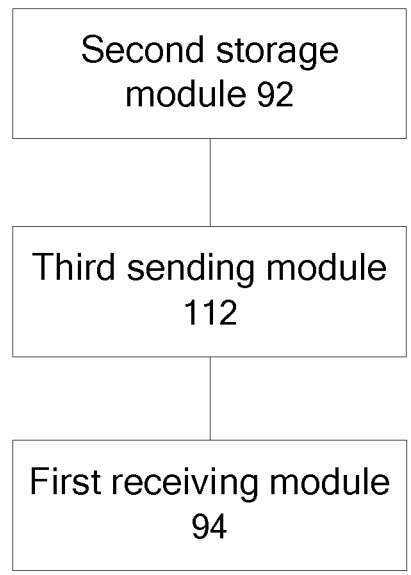
FIG. 11 is another exemplary structure block diagram of the device for processing CSI according to certain embodiments of the present disclosure.

FIG. 11 is a second exemplary structure block diagram of a second device for processing CSI according to an embodiment of the present disclosure, and as shown in FIG. 11, the device further includes, besides all the modules shown in FIG. 9, a third sending module 112. The third sending module 112 will be described below.

The third sending module 112 is coupled with the second storage module 92 and the first receiving module 94, and is configured to send second indication information to the UE, wherein the second indication information may be used for indicating codebook feedback accuracy for feeding back the CSI by the UE.

Figure 12:
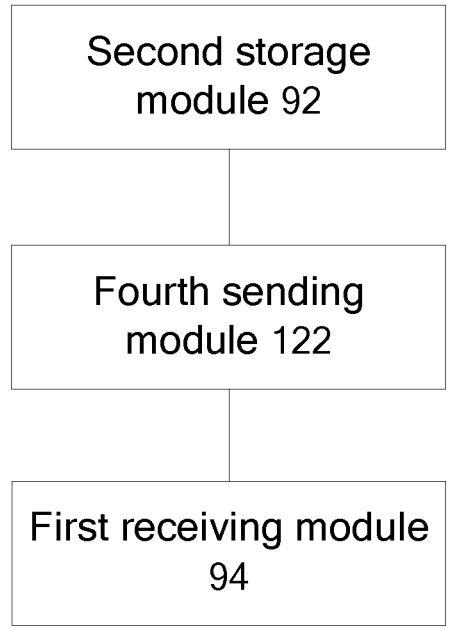
FIG. 12 is yet another exemplary structure block diagram of the device for processing CSI according to certain embodiments of the present disclosure.

FIG. 12 is a third exemplary structure block diagram of a second device for processing CSI according to an embodiment of the present disclosure, and as shown in FIG. 12, the device further includes, besides all the modules shown in FIG. 9, a fourth sending module 122. The fourth sending module 122 will be described below.

The fourth sending module 122 is coupled with the second storage module 92 and the first receiving module 94, and is configured to send third indication information to the UE, wherein the third indication information may be used for indicating the number of feedback parameters for feeding back the CSI by the UE.

In an exemplary embodiment, the precoding codebook model may include at least one of: $W_{I1}=[v_0\ \alpha v_1\ \beta v_2\ \gamma v_3]^T$ or $W_{I2}=[v'_0\ \alpha v'_1\ \beta v'_2\ \gamma v'_3\ \lambda v'_4\ \mu v'_5\ \kappa v'_6\ \tau v'_7]^T$ identified by a first type of codebook index; $W_{IJ1}=\Lambda\cdot[v_0\ \alpha v_1\ \beta v_2\ \gamma v_3]^T$ or $W_{IJ2}=\Lambda\cdot[v'_0\ \alpha v'_1\ \beta v'_2\ \gamma v'_3\ \lambda v'_4\ \mu v'_5\ \kappa v'_6\ \tau v'_7]$ identified by both the first type of codebook index and a second type of codebook index, wherein basic matrixes $v_0$, $v_1$, $v_2$ and $v_3$ are all $v\times(N_t/4)$-dimensional matrixes, basic matrixes $v'_0$, $v'_1$, $v'_2$, $v'_3$, $v'_4$, $v'_5$, $v'_6$ and $v'_7$ are all $v\times(N_t/8)$-dimensional matrixes, $\alpha$, $\beta$, $\gamma$, $\lambda$, $\mu$, $\kappa$ and $\tau$ are phase parameters, and are complex numbers, and $N_t$ is a total number of antennae, and is an integer more than or equal to 16; and $v$ represents a total number of layers, and is a positive integer more than or equal to 1 and less than or equal to $N_t$, $\Lambda$ is a diagonal matrix and not all element amplitudes are the same.

Figure 13:
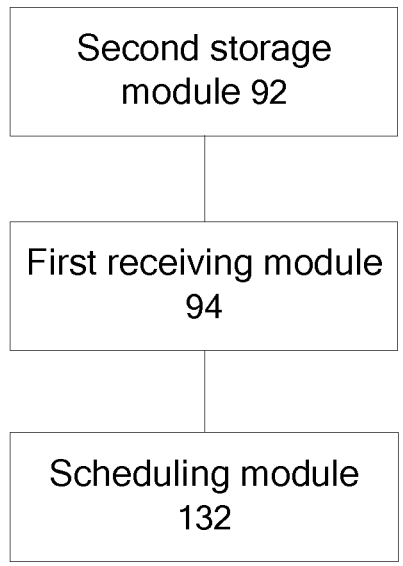
FIG. 13 is a further exemplary structure block diagram of the device for processing CSI according to certain embodiments of the present disclosure.

FIG. 13 is a fourth exemplary structure block diagram of a second device for processing CSI according to an embodiment of the present disclosure, and as shown in FIG. 13, the device further includes, besides all the modules shown in FIG. 9, a scheduling module 132. The scheduling module 132 will be described below.

The scheduling module 132 is coupled with the first receiving module 94, and is configured to schedule, for the UE, a downlink transmission manner corresponding to the UE according to a codebook corresponding to the precoding codebook model for feeding back the CSI and the CSI, wherein the downlink transmission manner may include at least one of: an SU-MIMO transmission mode, an MU-MIMO transmission mode, a single-user dynamic handover transmission mode, a multi-user dynamic handover transmission mode and a coordinated multi-point transmission mode.

Figure 14:
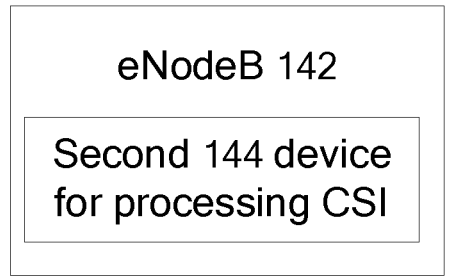
FIG. 14 is a structure block diagram of an eNodeB according to certain embodiments of the present disclosure.

FIG. 14 is a structure block diagram of an eNodeB according to an embodiment of the present disclosure, and as shown in FIG. 14, the eNodeB 142 includes the second device for processing CSI 144 mentioned in any one of the abovementioned items.

Based on the problems in the related technology, a CSI feedback method is provided in the embodiment, and by the method, an eNodeB or UE may achieve higher precoding performance. The method will be described in levels below.

The CSI feedback method for an MIMO multicarrier communication system includes that: UE feeds back CSI to an eNode B, wherein the CSI includes codebook index information, and the codebook index information includes one of: a first type of codebook index I, and the first type of codebook index I and a second type of codebook index J.

It is important to note that the first type of codebook index I is configured for $N_t\times v$ to indicate a precoding matrix W, and the precoding matrix is consistent with one of:
$W_{I1}=[v_0\ \alpha v_1\ \beta v_2\ \gamma v_3]^T$ or $W_{I2}=[v'_0\ \alpha v'_1\ \beta v'_2\ \gamma v'_3\ \lambda v'_4\ \mu v'_5\ \kappa v'_6\ \tau v'_7]^T$; and a combination of the first type of codebook index I and the second type of codebook index J is used for indicating a precoding matrix U, and the precoding matrix is consistent with at least one of:
$W_{I1}=\Lambda\cdot[v_0\ \alpha v_1\ \beta v_2\ \gamma v_3]^T$ or $W_{I2}=\Lambda\cdot[v'_0\ \alpha v'_1\ \beta v'_2\ \gamma v'_3\ \lambda v'_4\ \mu v'_5\ \kappa v'_6\ \tau v'_7]$, wherein $\Lambda$ is a diagonal matrix and not all element amplitudes are the same.

In the embodiment, basic matrixes $v_0$, $v_1$, $v_2$ and $v_3$ are all $v\times(N_t/4)$-dimensional matrixes, basic matrixes $v'_0$, $v'_1$, $v'_2$, $v'_3$, $v'_4$, $v'_5$, $v'_6$ and $v'_7$ are all $v\times(N_t/8)$-dimensional matrixes, $\alpha$, $\beta$, $\gamma$, $\lambda$, $\mu$, $\kappa$ and $\tau$ are all complex numbers, and $N_t$ represents a total port number or a total number of antennae, and is an integer more than or equal to 16; and $v$ represents a total number of layers, and is a positive integer more than or equal to 1 and less than or equal to $N_t$.

In the embodiment, the first type of code index I includes: any one of: i, (i1,i2) and (i1,i2,i3); i, i1, i2 and i3 are positive integers more than or equal to 1; and the second type of codebook index J is j or (j1,j2); and j, j1 and j2 are positive integers more than or equal to 1.

In the embodiment, the first type of codebook index I is used for indicating $[v_0\ \alpha v_1\ \beta v_2\ \gamma v_3]^T$ information or $[v'_0\ \alpha v'_1\ \beta v'_2\ \gamma v'_3\ \alpha\lambda'_4\ \mu v'_5\ \kappa v'_6\ \tau v'_7]^T$; and the second type of codebook index J is used for indicating $\Lambda$ information.

It is important to point out that many indication manners may be adopted for the first type of index I and the second type of index, and some examples will be given for description. For example, when the first type of index I is (i1,i2), it is used for indicating information of basic matrixes $v_0$, $v_1$, $v_2$ and $v_3$ or basic matrixes $v'_0$, $v'_1$, $v'_2$, $v'_3$, $v'_4$, $v'_5$, $v'_6$ and $v'_7$; and i2 is used for indicating information of $\alpha$, $\beta$ and $\gamma$ or information of $\alpha$, $\beta$, $\gamma$, $\lambda$, $\mu$, $\kappa$ and $\tau$.

For another example, when the first type of index I is (i1,i2,i3), i1 and i2 are both used for indicating the information of basic matrixes $v_0$, $v_1$, $v_2$ and $v_3$ or basic matrixes $v'_0$, $v'_1$, $v'_2$, $v'_3$, $v'_4$, $v'_5$, $v'_6$ and $v'_7$; and i3 is used for indicating the information of $\alpha$, $\beta$ and $\gamma$ or the information of $\alpha$, $\beta$, $\gamma$, $\lambda$, $\mu$, $\kappa$ and $\tau$.

According to different values of the basic matrixes, the precoding matrix W may also be different, and for example, the precoding matrix may include at least one of:
$W_{I1}=[v_0\ \alpha v_1\ \beta v_2\ \gamma v_3]^T$ and $v_{0=}v_{1=}v_{2=}v_3$, and
$W_{I2}=[v'_0\ \alpha v'_1\ \beta v'_2\ \gamma v'_3\ \alpha\lambda'_4\ \mu v'_5\ \kappa v'_6\ \tau v'_7]^T$ and $v'_{0=}v'_{1=}v'_{2=}v'_{3=}v'_{4=}v'_{5=}v'_{6=}v'_7$.

For another example, the precoding matrix U may also be consistent with at least one of:
$W_{IJ1}=\Lambda\cdot[v_0\ \alpha v_1\ \beta v_2\ \gamma v_3]^T$ and basic matrixes $v_{0=}v_{1=}v_{2=}v_3$, and
$W_{IJ2}=\Lambda\cdot[v'_0\ \alpha v'_1\ \beta v'_2\ \gamma v'_3\ \alpha\lambda'_4\ \mu v'_5\ \kappa v'_6\ \tau v'_7]$ and basic matrixes $v'_{0=}v'_{1=}v'_{2=}v'_{3=}v'_{4=}v'_{5=}v'_{6=}v'_7$.

For a third example, the precoding matrix W is consistent with at least one of that:
$W_{I1}=[v_0\ \alpha v_1\ \beta v_2\ \gamma v_3]^T$, $v_0$, $v_1$, $v_2$ and $v_3$ are equally divided into K1 groups, and all the basic matrixes in each group are the same; $W_{I2}=[v'_0\ \alpha v'_1\ \beta v'_2\ \gamma v'_3\ \alpha\lambda'_4\ \mu v'_5\ \kappa v'_6\ \tau v'_7]^T$, $v'_0$, $v'_1$, $v'_2$, $v'_3$, $v'_4$, $v'_5$, $v'_6$ and $v'_7$ are equally divided into K2 groups, and all the basic matrixes in each group are the same; and both K1 and K2 are positive integers more than or equal to 1.

For a fourth example, the precoding matrix U is consistent with at least one of that:
$W_{IJ1}=\Lambda\cdot[v_0\ \alpha v_1\ \beta v_2\ \gamma v_3]^T$, $v_0$, $v_1$, $v_2$ and $v_3$ are equally divided into K3 groups, and all the basic matrixes in each group are the same; and $W_{IJ2}=\Lambda\cdot[v'_0\ \alpha v'_1\ \beta v'_2\ \gamma v'_3\ \alpha\lambda'_4\ \mu v'_5\ \kappa v'_6\ \tau v'_7]$, $v'_0$, $v'_1$, $v'_2$, $v'_3$, $v'_4$, $v'_5$, $v'_6$ and $v'_7$ are equally divided into K4 groups, and all the basic matrixes in each group are the same, wherein both K3 and K4 are positive integers more than or equal to 1.

In the embodiment, grouping parameters K1, K2, K3 or K4 may be configured for the UE by the eNodeB through signaling. In an exemplary embodiment, the eNodeB configures grouping parameters K1, K2, K3 or K4 for the UE according to the number of sending antennae. Configuration of the grouping parameter may also be determined in multiple manners, and for example, the eNodeB may independently configure information of the feedback model grouping parameter K1, K2, K3 or K4 on a PUCCH and a PUSCH to the UE. The UE may also independently select the feedback model grouping parameter K1, K2, K3 or K4 according to the PUSCH and the PUCCH.

On the other aspect, the UE feeds back signaling to the eNodeB, the signaling being used for indicating a precoding codebook model adopted by the UE. It is important to point out that multiple manners may be adopted for parameters $\alpha$, $\beta$ and $\gamma$ of precoding matrix $W_{f1}=[v_0\ \alpha v_1\ \beta v_2\ \gamma v_3]^T$. For example, they may form one of the following relationships: $\beta=2\alpha$ and $\gamma=3\alpha$; and $\gamma=\alpha\cdot\beta$. Multiple manners may also be adopted for parameters $\alpha$, $\beta$, $\gamma$, $\lambda$, $\mu$, $\Lambda$ and $\tau$ of precoding matrix $W_{f2}=[v'_0\ \alpha v'_1\ \beta v'_2\ \gamma v'_3\ \lambda v'_4\ \mu v'_5\ \kappa v'_6\ \tau v'_7]^T$. For example, they may form one of the following relationships: $\beta=2\alpha$, $\gamma=3\alpha$, $\lambda=4\alpha$, $\mu=5\alpha$, $\kappa=6\alpha$, and $\tau=7\alpha$; $\beta=2\alpha$, $\gamma=3\alpha$, $\mu=\lambda\cdot\alpha$, $\kappa=\lambda\cdot\alpha^2$ and $\tau=\lambda\cdot\alpha^3$; $\lambda=\beta^2$, $\kappa=\beta^3$, $\gamma=\alpha\cdot\beta$, $\mu=\alpha\cdot\beta^2$ and $\mu=\tau\cdot\beta^3$; $\gamma=\alpha\cdot\beta$, $\mu=\alpha\cdot\lambda$ and $\tau=\alpha\cdot\kappa$; and $\gamma=\alpha\cdot\beta$, $\mu=\alpha\cdot\lambda$ and $\tau=\alpha\cdot\kappa$.

Similarly, a feedback manner for parameters $\alpha$, $\beta$, $\gamma$, $\lambda$, $\mu$, $\Lambda$ and $\tau$ is configured for the UE by the eNodeB through signaling.

Feedback accuracy of parameters $v_0$, $v_1$, $v_2$, and $v_3$ or $v'_0$, $v'_1$, $v'_2$, $v'_3$, $v'_4$, $v'_5$, $v'_6$ and $v'_7$ may also be configured for the UE by the eNodeB through signaling.

Feedback accuracy of parameters $\alpha$, $\beta$ and $\gamma$ or $\alpha$, $\beta$, $\gamma$, $\lambda$, $\mu$, $\Lambda$ and $\tau$ may also be configured for the UE by the eNodeB through signaling.

In an exemplary embodiment, the first type of codebook index I is configured for $N_t \times v$ to indicate the precoding matrix W, and the method further includes that: the UE determines the number of the total number of layers $v$ and a code word matrix W in a first codebook matrix according to spatial channel information, its corresponding index being the first type of codebook index I, and feeds back the first type of codebook index I, wherein W is a complex matrix of $N_t \times v$.

In addition, for the code word matrix W, when I is (i1,i2,i3), i1 and i2 are used for determining basic matrixes $v_0$, $v_1$, $v_2$, and $v_3$ or $v'_0$, $v'_1$, $v'_2$, $v'_3$, $v'_4$, $v'_5$, $v'_6$ and $v'_7$; and i3 is used for determining $\alpha$, $\beta$ and $\gamma$ or $\alpha$, $\beta$, $\gamma$, $\lambda$, $\mu$, $\Lambda$ and $\tau$.

In an exemplary embodiment, the combination of the first type of codebook index I and the second type of codebook index J is used for indicating the precoding matrix U, and the method further includes that: the UE determines information of the total number of layers $v$ and the code word matrix W in the first codebook matrix based on channel measurement, its corresponding index being the first type of codebook index I, and feeds back the first type of codebook index I, wherein W is a complex matrix of $N_t \times v$, and $W_{f1}=[v_0\ \alpha v_1\ \beta v_2\ \gamma v_3]^T$ or $W_{f2}=[v'_0\ \alpha v'_1\ \beta v'_2\ \gamma v'_3\ \lambda v'_4\ \mu v'_5\ \kappa v'_6\ \tau v'_7]^T$; and the UE determines a code word matrix $\Lambda$ in a second type of codebook, its corresponding index being the second type of codebook index J, and feeds back the second type of codebook index J, wherein $\Lambda$ is a complex matrix of $N_t \times N_t$.

In the embodiment, the diagonal matrix $\Lambda$ is used for changing amplitudes and phases of ports of $N_t$ antennae. The diagonal matrix $\Lambda=I+A$, and the second type of codebook index J indicates the A information, wherein I is a unit matrix and A is any complex matrix.

In the exemplary embodiment, the eNodeB may perform normalization processing on the obtained code word matrix W or U.

After the eNodeB acquires the corresponding code word matrix, the eNodeB schedules the UE with reference to the obtained code word matrix, and selects a downlink transmission manner to communicate with the UE; and the downlink transmission manner includes any one of an SU-MIMO transmission mode, an MU-MIMO transmission mode, a single-user/multi-user dynamic handover transmission mode and a coordinated multi-point transmission mode.

In the embodiment, a channel information feedback model configuration method for an MIMO communication system is further provided, which includes that: an eNode B sends configuration signaling to UE, the signaling being used for indicating a feedback model adopted for feeding back a precoding vector or matrix by the UE in an uplink direction.

In an exemplary embodiment, the UE may feed back precoding vector or matrix information according to the feedback model, wherein the processing that the eNodeB sends the configuration signaling may include at least one of that: the eNodeB independently performs configuration for precoding models fed back on a PUCCH and a PUSCH, and the eNodeB independently configures feedback accuracy for the feedback model.

In the embodiment, a feedback method for a channel information feedback model in an MIMO communication system is further provided, which includes that: UE stores M sets of precoding codebook models, and the UE selects a set of codebook model for uplink feedback according to a channel state, wherein M is a positive integer more than or equal to 1. In the embodiment, the M sets of precoding codebook models include at least two of the following models: $W_{f1}=[v_0\ \alpha v_1\ \beta v_2\ \gamma v_3]^T$, $W_{f2}=[v'_0\ \alpha v'_1\ \beta v'_2\ \gamma v'_3\ \lambda v'_4\ \mu v'_5\ \kappa v'_6\ \tau v'_7]^T$, $W_{L/1}=\Lambda\cdot[v_0\ \alpha v_1\ \beta v_2\ \gamma v_3]^T$, $W_{L/2}=\Lambda\cdot[v'_0\ \alpha v'_1\ \beta v'_2\ \gamma v'_3\ \lambda v'_4\ \mu v'_5\ \kappa v'_6\ \tau v'_7]$, $W_1=[v_0]$ and $W_1=[v_0\ \alpha v_1]$, $\Lambda$ is a diagonal matrix and not all element amplitudes are the same.

The M sets of precoding codebook models further include at least two of the following models: $W_{f1}=[v_0\ \alpha v_1\ \beta v_2\ \gamma v_3]^T$ and $v_0, v_1, v_2, v_3$; $W_{f2}=[v'_0\ \alpha v'_1\ \beta v'_2\ \gamma v'_3\ \lambda v'_4\ \mu v'_5\ \kappa v'_6\ \tau v'_7]^T$ and $v'_0, v'_1, v'_2, v'_3, v'_4, v'_5, v'_6, v'_7$; $W_{L/1}=\Lambda\cdot[v_0\ \alpha v_1\ \beta v_2\ \gamma v_3]^T$ and basic matrixes $v'_0, v'_1, v'_2, v_3$; and $W_{L/2}=\Lambda\cdot[v'_0\ \alpha v'_1\ \beta v'_2\ \gamma v'_3\ \lambda v'_4\ \mu v'_5\ \kappa v'_6\ \tau v'_7]$ and basic matrixes $v'_0, v'_1, v'_2, v'_3, v'_4, v'_5, v'_6, v'_7$.

In the embodiment, CSI feedback UE is further provided, which includes: a feedback unit, configured to feed back CSI to an eNodeB, the CSI including code index information and a proportion parameter, wherein the codebook index information includes: a first type of codebook index I and/or a second type of codebook index J.

In the embodiment, a CSI acquisition eNodeB is further provided, which includes: an acquisition unit, configured to acquire CSI fed back by UE, the CSI including codebook index information and a proportion parameter, wherein the codebook index information includes: a first type of codebook index I and/or a second type of codebook index J. In an exemplary embodiment, the acquisition unit further includes: a normalization processing subunit, configured for the eNodeB to perform normalization processing on an obtained code word matrix.

The acquisition unit may further include: a scheduling subunit, configured for the eNodeB to schedule the UE with reference to the obtained code word matrix, and select a downlink transmission manner to communicate with the UE, the downlink transmission manner including any one of an SU-MIMO transmission mode, an MU-MIMO transmission mode, a single-user/multi-user dynamic handover transmission mode and a coordinated multi-point transmission mode.

Exemplary implementation modes of the present disclosure will be described below.

Exemplary Embodiment 1

An eNodeB and UE store the same set or sets of codebook models. The codebook models stored by the UE and the eNodeB may be one or more of the following codebook models:

$W_{J1} = [v_0 \; \alpha v_1 \; \beta v_2 \; \gamma v_3]^T$, $W_{J2} = [v'_0 \; \alpha v'_1 \; \beta v'_2 \; \gamma v'_3 \; \lambda v'_4 \; \mu v'_5 \; \kappa v'_6 \; \tau v'_7]^T$, $W_{LJ1} = \Lambda \cdot [v_0 \; \alpha v_1 \; \beta v_2 \; \gamma v_3]^T$, $\Lambda$ being a diagonal matrix and not all element amplitudes being the same, and $W_{LJ2} = \Lambda \cdot [v'_0 \; \alpha v'_1 \; \beta v'_2 \; \gamma v'_3 \; \lambda v'_4 \; \mu v'_5 \; \kappa v'_6 \; \tau v'_7]$, $\Lambda$ being a diagonal matrix and not all element amplitudes being the same, wherein basic matrixes $v_0$, $v_1$, $v_2$ and $v_3$ are all $v \times (N_t/4)$-dimensional matrixes, basic matrixes $v'_0$, $v'_1$, $v'_2$, $v'_3$, $v'_4$, $v'_5$, $v'_6$ and $v'_7$ are all $v \times (N_t/8)$-dimensional matrixes, $\alpha$, $\beta$, $\gamma$, $\lambda$, $\mu$, $\kappa$ and $\tau$ are all complex numbers, $N_t$ represents a total port number or a total number of antennae, and $v$ represents a total number of layers, and is a positive integer more than or equal to 1 and less than or equal to $N_t$;

the eNodeB sends a CSI-RS to the UE;

the UE receives and measures the CSI-RS sent by the eNodeB, and measures and estimates information of a current channel H by virtue of the CSI-RS;

the UE quantizes the channel information according to the information of the channel H and a channel codebook model;

the UE feeds back the quantized channel information on an uplink channel; and the eNodeB selects and receives the channel information sent by the UE.

Exemplary Embodiment 2

Figure 15:
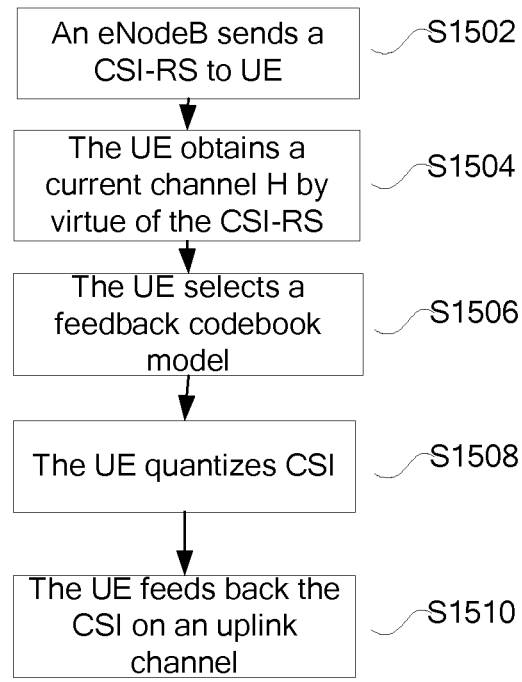
FIG. 15 is a flowchart of exemplary embodiment 2 of the present disclosure.

In the embodiment, a function of selecting a feedback codebook model by UE is realized, and the UE performs channel quantization and reporting according to the selected feedback codebook model. FIG. 15 is a flowchart of exemplary embodiment 2 of the present disclosure, and as shown in FIG. 15, the flow includes the following steps.

Step S1502: an eNodeB and the UE store the same set or sets of codebook models, and the eNodeB sends a CSI-RS to the UE.

Step S1504: the UE acquires information of a current channel H through the CSI-RS, namely the UE receives and measures the CSI-RS sent by the eNodeB, and measures and estimates the information of the current channel H by virtue of the CSI-RS.

Step S1506: the UE selects a codebook model according to the information of the channel H, that is, if the eNodeB and the UE store the same sets of codebook models, for example, as shown in Table 3. Table 3 is a table of codebook models stored by an eNodeB and UE according to exemplary embodiment 2 of the present disclosure:

TABLE 3

| Index | Codebook model |
|---|---|
| 0 | $W_{J1} = [v_0 \; \alpha v_1 \; \beta v_2 \; \gamma v_3]^T$ |
| 1 | $W_{J2} = [v'_0 \; \alpha v'_1 \; \beta v'_2 \; \gamma v'_3 \; \lambda v'_4 \; \mu v'_5 \; \kappa v'_6 \; \tau v'_7]^T$ | the UE determines the set of model to be selected according to a condition of the current channel:

the UE sequentially selects each codebook model, generates codebooks according to the codebook models, and tests performance of the codebooks; the UE generates a code word according to the current channel H and codebook model 0, for example, the generated code word is $W_1 = 1/4 \cdot [1 \; j \; -1 \; -j \; 1 \; j \; -1 \; -j \; 1 \; j \; -1 \; -j \; 1 \; j]^T$, and tests a chordal distance $d_1 = 0.45$ between code word $W_{J1}$ and a feature vector of the channel H; the terminal generates a code word according to the current channel H and codebook model 1, for example, the generated code word is $W_{J2} = 1/4 \cdot [1 \; j \; -1 \; -j \; 1 \; j \; -1 \; -j \; 1 \; j \; -1 \; -j \; 1 \; j]^T$, and tests a chordal distance $d_2 = 0.40$ between code word $W_{J2}$ and the feature vector of the channel H; and the UE compares the chordal distances $d_1$ and $d_2$, and selects codebook model 1 corresponding to the smaller chordal distance $d_2$ for feedback.

Step S1508: the UE quantizes CSI according to the selected feedback codebook model.

The UE performs codebook quantization according to the selected codebook model $W_{J2} = [v'_0 \; \alpha v'_1 \; \beta v'_2 \; \gamma v'_3 \; \lambda v'_4 \; \mu v'_5 \; \kappa v'_6 \; \tau v'_7]^T$ to obtain information $v'_0$, $v'_1$, $v'_2$, $v'_3$, $v'_4$, $v'_5$, $v'_6$ and $v'_7$ and information $\alpha$, $\beta$, $\gamma$, $\lambda$, $\mu$, $\kappa$ and $\tau$ to be reported.

For example, the UE quantizes $v'_0$, $v'_1$, $v'_2$, $v'_3$, $v'_4$, $v'_5$, $v'_6$ and $v'_7$ by adopting 3 bits respectively, wherein $v'_0$, $v'_1$, $v'_2$, $v'_3$, $v'_4$, $v'_5$, $v'_6$ and $v'_7$ are 1×2 Discrete Fourier Transform (DFT) vectors, and as shown in Table 4, Table 4 is a table of a corresponding relationship between a quantization index and a DFT vector according to exemplary embodiment 2 of the present disclosure.

TABLE 4

| Index | DFT vector |
|---|---|
| 0 | [1 1] |
| 1 | $[1 \; e^{j\frac{\pi}{4}}]$ |
| 2 | [1 j] |
| 3 | $[1 \; e^{j\frac{3\pi}{4}}]$ |
| 4 | [1 −1] |
| 5 | $[1 \; e^{j\frac{5\pi}{4}}]$ |
| 6 | [1 −j] |
| 7 | $[1 \; e^{j\frac{7\pi}{4}}]$ |

The UE further quantizes the information $\alpha$, $\beta$, $\gamma$, $\lambda$, $\mu$, $\kappa$ and $\tau$ by virtue of 3 bits, and as shown in Table 5, Table 5 is a table of a corresponding relationship between a phase coefficient index and a quantization phase according to exemplary embodiment 2 of the present disclosure.

TABLE 5

| Index | 0 | 1 | 2 | 3 | 4 | 5 | 6 | 7 |
|---|---|---|---|---|---|---|---|---|
| Phase coefficient | 1 | $e^{j\frac{\pi}{4}}$ | j | $e^{j\frac{3\pi}{4}}$ | −1 | $e^{j\frac{5\pi}{4}}$ | −j | $e^{j\frac{7\pi}{4}}$ |

Step S1510: the UE feeds back the CSI on an uplink channel, that is, the UE feeds back codebook model index 1 on the uplink channel, and feeds back the information $v'_0$, $v'_1$, $v'_2$, $v'_3$, $v'_4$, $v'_5$, $v'_6$ and $v'_7$ and $\alpha$, $\beta$, $\gamma$, $\lambda$, $\mu$, $\kappa$ and $\tau$; and the eNodeB receives codebook model index information fed back by the UE, receives the information $v'_0$, $v'_1$, $v'_2$, $v'_3$, $v'_4$, $v'_5$, $v'_6$ and $v'_7$ and $\alpha$, $\beta$, $\gamma$, $\lambda$, $\mu$, $\kappa$ and $\tau$, and combines the information to obtain a codebook and the CSI.

Exemplary Embodiment 3

Figure 16:
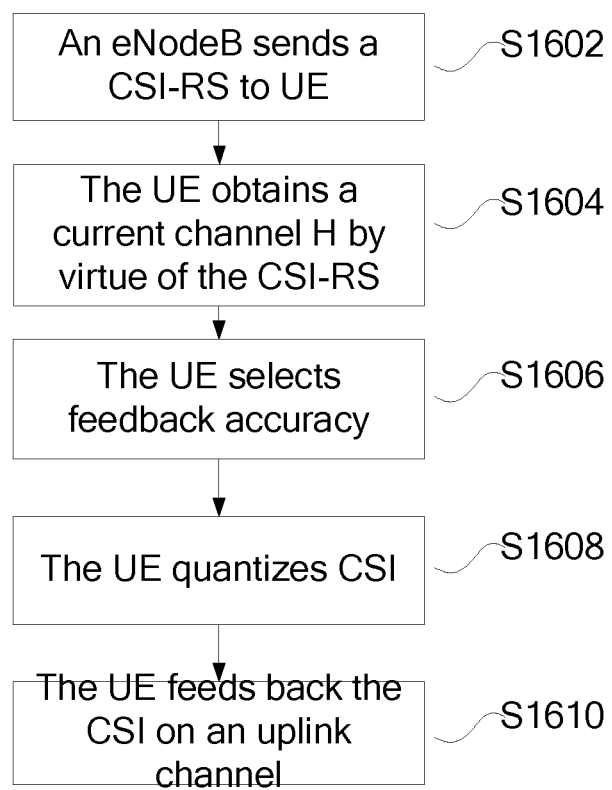
FIG. 16 is a flowchart of exemplary embodiment 3 of the present disclosure.

FIG. 16 is a flowchart of exemplary embodiment 3 of the present disclosure, and as shown in FIG. 16, a function of selecting feedback accuracy by UE is realized in the embodiment, and the UE performs channel quantization and reporting according to the selected feedback accuracy. The flow includes the following steps.

Step S1602: an eNodeB and the UE store the same set or sets of codebook models, and the eNodeB sends a CSI-RS to the UE.

Step S1604: the UE receives and measures the CSI-RS sent by the eNodeB, and measures and estimates information of a current channel H by virtue of the CSI-RS.

Step S1606: the UE selects codebook accuracy according to the information of the channel H.

The UE may select codebook reporting feedback accuracy according to a condition of the current channel or a reporting condition: for example, the eNodeB and the UE store the same reporting accuracy level information, and as shown in Table 6, Table 6 is a table of a codebook feedback accuracy index and overhead according to exemplary embodiment 3 of the present disclosure.

TABLE 6

| Index | Overhead (bits) |
|-------|-----------------|
| 0     | 8               |
| 1     | 16              |
| 2     | 28              |
| 3     | 32              |

For example, the UE selects feedback accuracy level 0 with lower feedback overheat if being about to perform uplink feedback on a PUCCH, and selects feedback accuracy 3 with higher feedback overhead if being about to perform feedback on a PUSCH.

The UE may also determine a feedback accuracy level according to the condition of the current channel H, and the UE selects feedback level 0 or 1 for feedback if measuring that the current channel is a strongly correlated channel, and selects feedback level 2 or 3 for uplink feedback if the current channel is a completely uncorrelated channel.

Step S1608: the UE quantizes CSI according to the selected feedback accuracy.

The UE performs quantization according to the feedback accuracy, and if the current feedback accuracy level is 2, feedback overhead is 28 bits and a codebook model is $W_{f1} = [v_0 \, \alpha v_1 \, \beta v_2 \, \gamma v_3]^T$, the UE may quantize information $v_0$, $v_1$, $v_2$ and $v_3$ with 4 bits and quantize information $\alpha$, $\beta$ and $\gamma$ with 4 bits.

Step S1610: the UE feeds back the CSI on the uplink channel, that is, the UE feeds back accuracy index 2 on the uplink channel, and feeds back the information $v_0$, $v_1$, $v_2$ and $v_3$ and $\alpha$, $\beta$ and $\gamma$.

The eNodeB receives codebook accuracy index information fed back by the UE, receives the information $v_0$, $v_1$, $v_2$ and $v_3$ and $\alpha$, $\beta$ and $\gamma$, and combines the information to obtain a codebook and the CSI.

Exemplary Embodiment 4

Figure 17:
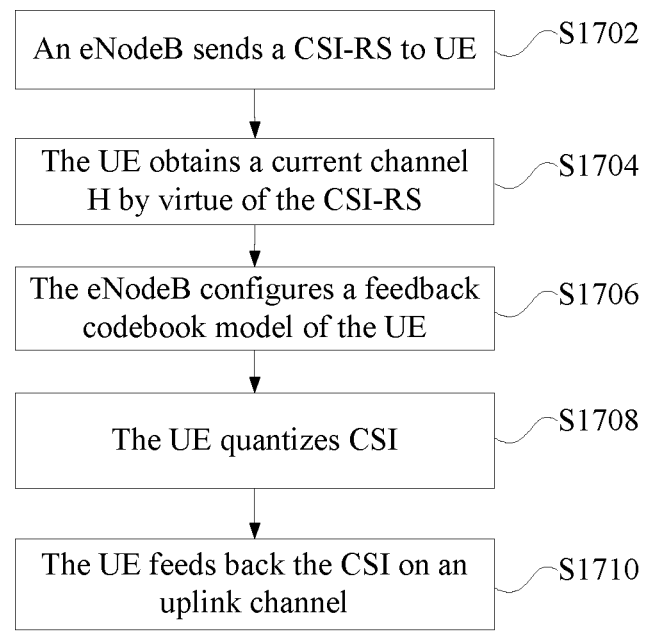
FIG. 17 is a flowchart of exemplary embodiment 4 of the present disclosure.

FIG. 17 is a flowchart of exemplary embodiment 4 of the present disclosure, and as shown in FIG. 17, a function of configuring a feedback codebook model of UE by an eNodeB is realized in the embodiment, and the UE performs channel quantization and reporting according to the configured feedback codebook model. The flow includes the following steps.

Step S1702: the eNodeB and the UE store the same set or sets of codebook models, and the eNodeB sends a CSI-RS to the UE.

Step S1704: the UE receives and measures the CSI-RS sent by the eNodeB, and measures and estimates information of a current channel H by virtue of the CSI-RS.

Step S1706: the eNodeB configures the feedback codebook model of the UE, that is, the eNodeB configures a codebook model to the UE.

Table 7 is a table of a corresponding relationship between a codebook model index and a codebook model according to exemplary embodiment 4 of the present disclosure, and as shown in Table 6, the codebook models stored by the eNodeB and the UE are:

TABLE 7

| Index | Codebook model |
|-------|----------------|
| 0     | $W_{f1} = [v_0 \, \alpha v_1 \, \beta v_2 \, \gamma v_3]^T$ |
| 1     | $W_{f2} = [v'_0 \, \alpha v'_1 \, \beta v'_2 \, \gamma v'_3 \, \lambda v'_4 \, \mu v'_5 \, \kappa v'_6 \, \tau v'_7]^T$ |

The eNodeB may configure the codebook model to the UE according to the current number of sending antennae, and if the current number of the sending antennae is 16, the eNodeB selects codebook model 0; and if the current number of the sending antennae is 64, the eNodeB configures codebook model 1 to the UE.

Step S1708: the UE quantizes CSI according to the feedback codebook model configured by the eNodeB.

If the codebook model configured for the UE by the eNodeB is model 1 at this moment, the UE performs codebook quantization according to codebook model $W_{f2} = [v'_0 \, \alpha v'_1 \, \beta v'_2 \, \gamma v'_3 \, \lambda v'_4 \, \mu v'_5 \, \kappa v'_6 \, \tau v'_7]^T$ to obtain information $v'_0$, $v'_1$, $v'_2$, $v'_3$, $v'_4$, $v'_5$, $v'_6$ and $v'_7$ and information $\alpha$, $\beta$, $\gamma$, $\lambda$, $\mu$, $\kappa$ and $\tau$ to be reported.

Step S1710: the UE feeds back the CSI on an uplink channel, that is, the UE feeds back the information $v'_0$, $v'_1$, $v'_2$, $v'_3$, $v'_4$, $v'_5$, $v'_6$ and $v'_7$ and $\alpha$, $\beta$, $\gamma$, $\lambda$, $\mu$, $\kappa$ and $\tau$ and $\tau$ on the uplink channel; and the eNodeB receives the information $v'_0$, $v'_1$, $v'_2$, $v'_3$, $v'_4$, $v'_5$, $v'_6$ and $v'_7$ and $\alpha$, $\beta$, $\gamma$, $\lambda$, $\mu$, $\kappa$ and $\tau$ fed back by the UE, and combines the information to obtain a codebook and the CSI.

Exemplary Embodiment 5

Figure 18:
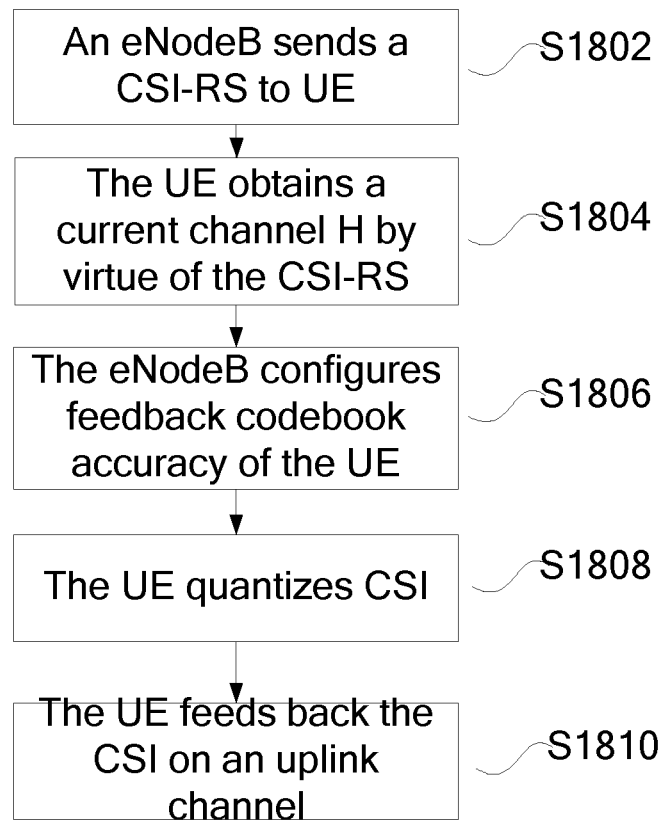
FIG. 18 is a flowchart of exemplary embodiment 5 of the present disclosure.

FIG. 18 is a flowchart of exemplary embodiment 5 of the present disclosure, and as shown in FIG. 18, a function of configuring feedback accuracy to UE by an eNodeB is realized in the embodiment, and the UE performs channel quantization and reporting according to the configured feedback accuracy. The flow includes the following steps.

Step S1802: the eNodeB and the UE store the same set or sets of codebook models, and the eNodeB sends a CSI-RS to the UE.

Step S1804: the UE receives and measures the CSI-RS sent by the eNodeB, and measures and estimates information of a current channel H by virtue of the CSI-RS.

Step S1806: the eNodeB configures codebook accuracy to the UE.

The eNodeB may configure different codebook reporting feedback accuracy to the UE according to a condition of the current channel or a reporting condition.

Table 8 is a table of a corresponding relationship between a codebook accuracy index and overhead according to exemplary embodiment 8 of the present disclosure, and as shown in Table 8, the eNodeB and the UE store the same reporting accuracy level information.

TABLE 8

| Index | Overhead (bits) |
|---|---|
| 0 | 8 |
| 1 | 16 |
| 2 | 28 |
| 3 | 32 |

For example, feedback accuracy level 0 with lower feedback overheat is configured for the UE if the UE is about to perform uplink feedback on a PUCCH, and feedback accuracy 3 with higher feedback overhead is configured for the UE if the UE is about to perform feedback on a PUSCH.

The eNodeB may also configure a feedback accuracy level to the UE according to the condition of the current channel H, configures feedback level 0 or 1 to the UE for feedback if the current channel is a strongly correlated channel, and configures feedback level 2 or 3 to the UE for uplink feedback if the current channel is a completely uncorrelated channel.

Step S1808: the UE quantizes CSI according to the selected feedback accuracy.

The UE performs quantization according to the configured feedback accuracy, and if the current feedback accuracy level is 2, feedback overhead is 28 bits and a codebook model is $W_{f1}=[v_0 \; \alpha v_1 \; \beta v_2 \; \gamma v_3]^T$, the UE may quantize information $v_0, v_1, v_2$ and $v_3$ with 4 bits and quantize information $\alpha, \beta$ and $\gamma$ with 4 bits.

Step S1810: the UE feeds back the CSI on the uplink channel, that is, the UE feeds back the information $v_0, v_1, v_2$ and $v_3$ and $\alpha, \beta$ and $\gamma$ on the uplink channel; and the eNodeB receives the information $v_0, v_1, v_2$ and $v_3$ and $\alpha, \beta$ and $\gamma$ fed back by the UE, and combines the information to obtain a codebook and the CSI.

Exemplary Embodiment 6

Figure 19:
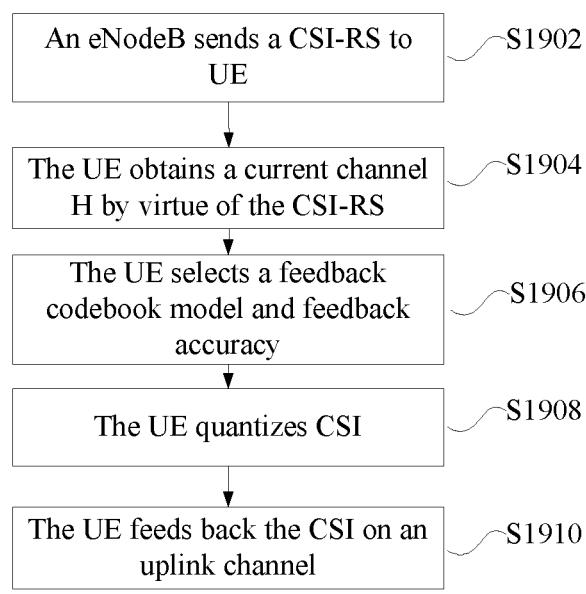
FIG. 19 is a flowchart of exemplary embodiment 6 of the present disclosure.

FIG. 19 is a flowchart of exemplary embodiment 6 of the present disclosure, and as shown in FIG. 19, a function of selecting a feedback codebook model and feedback accuracy by UE is realized in the embodiment, and the UE performs channel quantization and reporting according to the selected feedback codebook model. The flow includes the following steps.

Step S1902: an eNodeB and the UE store the same set or sets of codebook models, and the eNodeB sends a CSI-RS to the UE.

Step S1904: the UE receives and measures the CSI-RS sent by the eNodeB, and measures and estimates information of a current channel H by virtue of the CSI-RS.

Step S1906: the UE selects a codebook model and feedback accuracy according to the information of the channel H.

If the eNodeB and the UE store the same sets of codebook models,

Table 9 is a table of a corresponding relationship between a codebook model index and a codebook model according to exemplary embodiment 6 of the present disclosure, and as shown in Table 9, the codebook models stored by the eNodeB and the UE are:

TABLE 9

| Index | Codebook model |
|---|---|
| 0 | $W_{f1} = [v_0 \; \alpha v_1 \; \beta v_2 \; \gamma v_3]^T$ |
| 1 | $W_{f2} = [v'_0 \; \alpha v'_1 \; \beta v'_2 \; \gamma v'_3 \; \lambda v'_4 \; \mu v'_5 \; \kappa v'_6 \; \tau v'_7]^T$ |

TABLE 9-continued

| Index | Codebook model |
|---|---|
| 2 | $W_{f3} = [v''_0 \; \alpha v''_1]^T$ |
| 3 | $W_{f4} = [v'''_0]^T$ |

In the embodiment, $v''_0$ and $v''_1$ are matrixes of $v \times (N_t/2)$, and $v'''_0$ is a DFT vector of $v \times (N_t)$.

The UE determines the set of model to be selected according to a condition of the current channel.

The UE sequentially selects each codebook model, generates codebooks according to the codebook models, and tests performance of the codebooks; the UE generates a code word according to the current channel H and codebook model 0, for example, the generated code word is $W_{f1}=1/4 \cdot [1 \; j \; -1 \; -j \; 1 \; j \; -1 \; -j \; -1 \; -j \; 1 \; j \; -1 \; -j \; 1 \; j]^T$, and tests a chordal distance $d_1=0.45$ between code word $W_{f1}$ and a feature vector of the channel H; the terminal generates a code word according to the current channel H and codebook model 1, for example, the generated code word is $W_{f2}=1/4 \cdot [1 \; j \; -1 \; -j \; 1 \; j \; -1 \; -j \; -1 \; -j \; 1 \; j \; -1 \; -j \; 1 \; j]^T$, and tests a chordal distance $d_2=0.40$ between code word $W_{f2}$ and the feature vector of the channel H; and the UE compares the chordal distances $d_1$ and $d_2$, and selects codebook model 1 corresponding to the smaller chordal distance $d_2$ for feedback.

The UE selects codebook reporting feedback accuracy according to the condition of the current channel or a reporting condition, the eNodeB and the UE store the same reporting accuracy level information, and as shown in Table 10, Table 10 is a table of correspondence between a codebook accuracy index and codebook overhead according to exemplary embodiment 6 of the present disclosure.

TABLE 10

| Index | Overhead (bits) |
|---|---|
| 0 | 8 |
| 1 | 16 |
| 2 | 28 |
| 3 | 53 |

For example, if the UE is about to perform feedback on a PUSCH and has a higher requirement on codebook accuracy, the UE selects feedback accuracy 3 with higher feedback overhead.

Step S1908: the UE quantizes CSI according to the selected feedback codebook model.

The UE performs codebook quantization according to the selected codebook model $W_{f2}=[v'_0 \; \alpha v'_1 \; \beta v'_2 \; \gamma v'_3 \; \lambda v'_4 \; \mu v'_5 \; \kappa v'_6 \; \tau v'_7]^T$ to obtain information $v'_0, v'_1, v'_2, v'_3, v'_4, v'_5, v'_6$ and $v'_7$ and information $\alpha, \beta, \gamma, \lambda, \mu, \kappa$ and $\tau$ to be reported, and quantizes $v'_0, v'_1, v'_2, v'_3, v'_4, v'_5, v'_6$ and $v'_7$ with 4 bits and quantizes $\alpha, \beta, \gamma, \lambda, \mu, \kappa$ and $\tau$ with 4 bits according to the requirement of feedback overhead level 3 respectively.

Step S1910: the UE feeds back the CSI on the uplink channel, that is, the UE feeds back codebook model index 1 and feedback accuracy level 3 on the uplink channel, and feeds back the information $v'_0, v'_1, v'_2, v'_3, v'_4, v'_5, v'_6$ and $v'_7$ and $\alpha, \beta, \gamma, \lambda, \mu, \kappa$ and $\tau$; and the eNodeB receives codebook model index information and codebook feedback accuracy index information fed back by the UE, receives the information $v'_0, v'_1, v'_2, v'_3, v'_4, v'_5, v'_6$ and $v'_7$ and $\alpha, \beta, \gamma, \lambda, \mu, \kappa$ and $\tau$, and combines the information to obtain a codebook and the CSI.

Exemplary Embodiment 7

Figure 20:
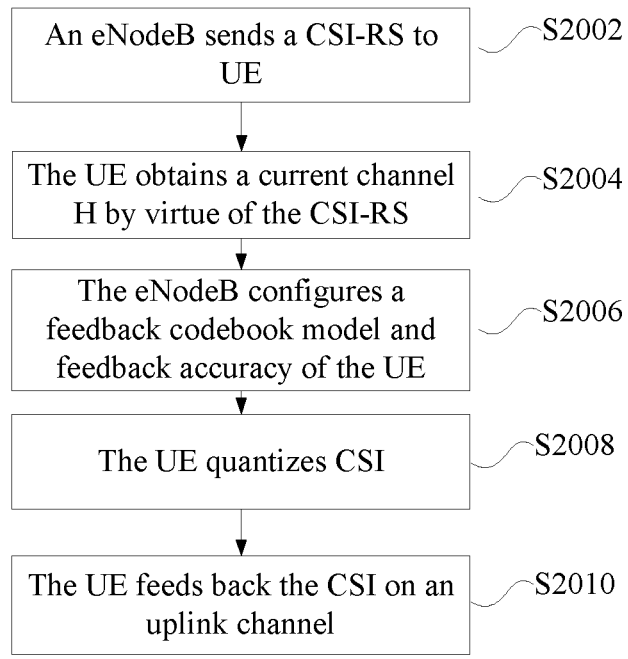
FIG. 20 is a flowchart of exemplary embodiment 7 of the present disclosure.

FIG. 20 is a flowchart of exemplary embodiment 7 of the present disclosure, and as shown in FIG. 20, a function of configuring a feedback codebook model of UE by an eNodeB is realized in the embodiment, and the UE performs channel quantization and reporting according to the configured feedback codebook model. The flow includes the following steps.

Step S2002: the eNodeB and the UE store the same set or sets of codebook models, and the eNodeB sends a CSI-RS to the UE.

Step S2004: the UE receives and measures the CSI-RS sent by the eNodeB, and measures and estimates information of a current channel H by virtue of the CSI-RS.

Step S2006: the UE configures a codebook model and feedback accuracy to the UE.

Table 11 is a table of a corresponding relationship between a codebook model index and a codebook model according to exemplary embodiment 7 of the present disclosure, and as shown in Table 11, the codebook models stored by the eNodeB and the UE are:

TABLE 11

| Index | Codebook model |
|---|---|
| 0 | $W_{f1} = [v_0 \ \alpha v_1 \ \beta v_2 \ \gamma v_3]^T$ |
| 1 | $W_{f2} = [v'_0 \ \alpha v'_1 \ \beta v'_2 \ \gamma v'_3 \ \lambda v'_4 \ \mu v'_5 \ \kappa v'_6 \ \tau v'_7]^T$ |

The eNodeB may configure the codebook model to the UE according to the current number of sending antennae, and if the current number of the sending antennae is 16, the eNodeB selects codebook model 0; and if the current number of the sending antennae is 64, the eNodeB configures codebook model 1 to the UE.

The eNodeB configures codebook reporting feedback accuracy to the UE according to a condition of the current channel or a reporting condition, the eNodeB and the UE store the same reporting accuracy level information, and as shown in Table 12, Table 12 is a table of a relationship between codebook feedback accuracy and overhead according to exemplary embodiment 7 of the present disclosure.

TABLE 12

| Index | Overhead (bits) |
|---|---|
| 0 | 8 |
| 1 | 16 |
| 2 | 28 |
| 3 | 53 |

For example, if the UE is about to perform feedback on a PUSCH and has a higher requirement on codebook accuracy, the eNodeB configures feedback accuracy 3 with higher feedback overhead to the UE.

Step S2008: the UE quantizes CSI according to the feedback codebook model configured by the eNodeB.

If the codebook model configured for the UE by the eNodeB is model 1, the UE performs codebook quantization according to codebook model $W_{f2}=[v'_0 \ \alpha v'_1 \ \beta v'_2 \ \gamma v'_3 \ \lambda v'_4 \ \mu v'_5 \ \kappa v'_6 \ \tau v'_7]^T$ to obtain information $v'_0, v'_1, v'_2, v'_3, v'_4, v'_5, v'_6$ and $v'_7$ and information $\alpha, \beta, \gamma, \lambda, \mu, \kappa$ and $\tau$ to be reported, and quantizes $v'_0, v'_1, v'_2, v'_3, v'_4, v'_5, v'_6$ and $v'_7$ with 4 bits and quantizes $\alpha, \beta, \gamma, \lambda, \mu, \kappa$ and $\tau$ with 3 bits according to the requirement of feedback overhead level 3 respectively.

Step S2010: the UE feeds back the CSI on an uplink channel, that is, the UE feeds back the information $v'_0, v'_1, v'_2, v'_3, v'_4, v'_5, v'_6$ and $v'_7$ and $\alpha, \beta, \gamma, \lambda, \mu, \kappa$ and $\tau$ on the uplink channel; and the eNodeB receives the information $v'_0, v'_1, v'_2, v'_3, v'_4, v'_5, v'_6$ and $v'_7$ and $\alpha, \beta, \gamma, \lambda, \mu, \kappa$ and $\tau$ fed back by the UE, and combines the information to obtain a codebook and the CSI.

Exemplary Embodiment 8

Like exemplary embodiment 2, UE may also select a codebook model in a manner that basic matrixes in a codebook are the same.

At first, an eNodeB and the UE may store the same set or sets of codebook models.

The eNodeB sends a CSI-RS to the UE.

The UE receives and measures the CSI-RS sent by the eNodeB, and measures and estimates information of a current channel H by virtue of the CSI-RS.

The UE selects a basic matrix relationship according to the information of the channel H.

For example, the codebook model stored by the eNodeB and the UE is: $W_{f1}=[v_0 \ \alpha v_1 \ \beta v_2 \ \gamma v_3]^T$, and the UE determines to select models $v_0, v_1, v_2$ and $v_3$ according to a condition of the current channel. If the UE measures that the current channel is a strongly correlated channel, the UE may select $v_0\_v_1\_v_2\_v_3$; if the current channel is a weakly correlated channel, the UE selects $v_0\_v_1$ and $v_2\_v_3$; and if the current channel is a completely uncorrelated channel, the UE selects different models $v_0, v_1, v_2$ and $v_3$.

The UE quantizes CSI according to a selected feedback codebook model.

The UE performs codebook quantization to obtain information $v_0$ and information $\alpha, \beta$ and $\gamma$ to be reported according to the selected codebook model $v_0\_v_1\_v_2\_v_3$.

The UE feeds back codebook model information on an uplink channel, and feeds back the information $v_0$ and $\alpha, \beta$ and $\gamma$.

The eNodeB receives the codebook model information fed back by the UE, receives the information $v_0$ and $\alpha, \beta$ and $\gamma$, and combines the information to obtain a codebook and the CSI.

Exemplary Embodiment 9

A codebook model in exemplary embodiment 8 may also be $W_{f2}=[v'_0 \ \alpha v'_1 \ \beta v'_2 \ \gamma v'_3 \ \lambda v'_4 \ \mu v'_5 \ \kappa v'_6 \ \tau v'_7]^T$.

Table 13 is a table of a relationship, determined by UE according to a model, between basic matrixes in the model according to exemplary embodiment 9 of the present disclosure, as shown in Table 13.

TABLE 13

| Index | Basic matrix relationship |
|---|---|
| 0 | $v'_0 = v'_1 = v'_2 = v'_3 = v'_4 = v'_5 = v'_6 = v'_7$ |
| 1 | $v'_0 = v'_1 = v'_2 = v'_3 \ v'_4 = v'_5 = v'_6 = v'_7$ |
| 2 | $v'_0 = v'_1 \ v'_2 = v'_3 \ v'_4 = v'_5 \ v'_6 = v'_7$ |
| 3 | $v'_0, v'_1, v'_2, v'_3, v'_4, v'_5, v'_6$ and $v'_7$ are different from one another |

The UE selects the basic matrix relationship according to a channel state.

Exemplary Embodiment 10

As shown in exemplary embodiment 4, an eNodeB may further configure a basic matrix relationship in a codebook model to UE.

At first, the eNodeB and the UE may store the same set or sets of codebook models.

The eNodeB sends a CSI-RS to the UE.

The UE receives and measures the CSI-RS sent by the eNodeB, and measures and estimates information of a current channel H by virtue of the CSI-RS.

The eNodeB configures the basic matrix relationship in the codebook model to the UE.

For example, the eNodeB and the UE stores a basic matrix relationship of $W_{f2}=[v'_0\ \alpha v'_1\ \beta v'_2\ \gamma v'_3\ \lambda v'_4\ \mu v'_5\ \kappa v'_6\ \tau v'_7]^T$, and as shown in Table 14, Table 14 is a table of a relationship between a basic matrix relationship and an index according to exemplary embodiment 10 of the present disclosure.

TABLE 14

| Index | Basic matrix relationship |
|---|---|
| 0 | $v'_0 = v'_1 = v'_2 = v'_3 = v'_4 = v'_5 = v'_6 = v'_7$ |
| 1 | $v'_0 = v'_1 = v'_2 = v'_3\ v'_4 = v'_5 = v'_6 = v'_7$ |
| 2 | $v'_0 = v'_1\ v'_2 = v'_3\ v'_4 = v'_5\ v'_6 = v'_7$ |
| 3 | $v'_0, v'_1, v'_2, v'_3, v'_4, v'_5, v'_6$ and $v'_7$ are different from one another |

The eNodeB may configure a basic matrix model of the codebook model to the UE according to a feature of the current channel. For example, if the current channel is a strongly correlated channel, it is configured that index=0.

The UE quantizes CSI according to the basic matrix relationship of the feedback codebook model configured by the eNodeB.

If the basic matrix relationship of the codebook model configured for the UE by the eNodeB is 0 at this moment, the UE performs codebook quantization to obtain information $v'_0$ and information $\alpha, \beta, \gamma, \lambda, \mu, \kappa$ and $\tau$ to be reported according to the codebook model.

The UE feeds back basic matrix relationship information $v'_0$ and the information $\alpha, \beta, \gamma, \lambda, \mu, \kappa$ and $\tau$ on an uplink channel.

The eNodeB receives codebook model information, $v'_0$ and information $\alpha, \beta, \gamma, \lambda, \mu, \kappa$ and $\tau$ fed back by the UE, and combines the information to obtain a codebook and the CSI.

Exemplary Embodiment 11

A model stored by an eNodeB and UE in exemplary embodiment 10 may also be: $V=\Lambda\cdot[v'_0, v'_1, v'_2, v'_3, v'_4, v'_5, v'_6$ and $v'_7]$, the model has a basic matrix comparison table, and as shown in Table 15, Table 15 is basic matrix comparison table 1 according to exemplary embodiment 11 of the present disclosure.

TABLE 15

| Index | Basic matrix relationship |
|---|---|
| 0 | $v'_0 = v'_1 = v'_2 = v'_3 = v'_4 = v'_5 = v'_6 = v'_7$ |
| 1 | $v'_0 = v'_1 = v'_2 = v'_3\ v'_4 = v'_5 = v'_6 = v'_7$ |
| 2 | $v'_0 = v'_1\ v'_2 = v'_3\ v'_4 = v'_5\ v'_6 = v'_7$ |
| 3 | $v'_0, v'_1, v'_2, v'_3, v'_4, v'_5, v'_6$ and $v'_7$ are different from one another |

Or, the model stored by the eNodeB and the UE in embodiment 10 may also be: $V=\Lambda\cdot[v_0\ \alpha v_1\ \beta v_2\ \gamma v_3]^T$, the model has a basic matrix comparison relationship, and as shown in Table 16, Table 16 is basic matrix comparison table 2 according to exemplary embodiment 11 of the present disclosure.

TABLE 16

| Index | Basic matrix relationship |
|---|---|
| 0 | $v_0 = v_1 = v_2 = v_3$ |
| 1 | $v_0 = v_1\ v_2 = v_3$ |
| 2 | $v_0, v_1, v_2,$ and $v_3$ are different from one another |
| 3 | Reserved |

Exemplary Embodiment 12

Figure 21:
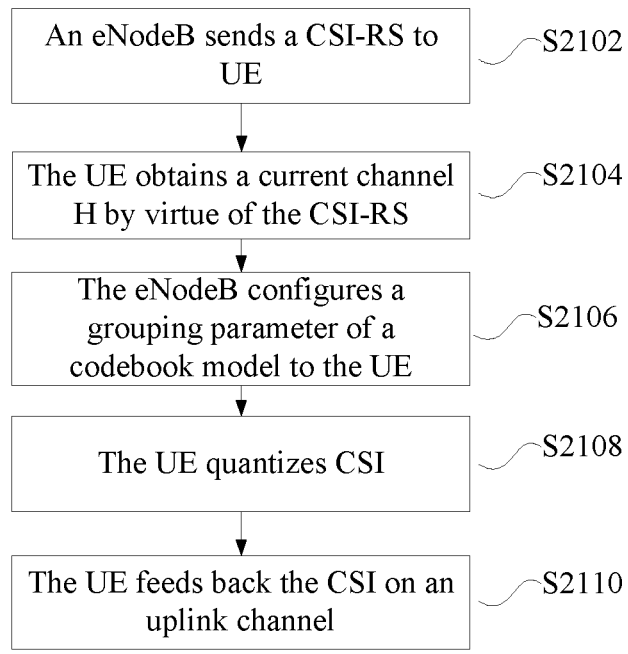
FIG. 21 is a flowchart of exemplary embodiment 11 of the present disclosure.

FIG. 21 is a flowchart of exemplary embodiment 11 of the present disclosure, and before related steps are executed, it is important to note the following points.

An eNodeB and UE store the same precoding codebook model respectively, and the same codebook model may be configured for the UE by the eNodeB, may also be independently selected by the UE, and may further be a set of codebook model stored by both of the eNodeB and the UE. It is supposed that the stored model is $W_{f1}=[v_0\ \alpha v_1\ \beta v_2\ \gamma v_3]^T$.

The eNodeB configures a grouping parameter of basic matrixes in the codebook model to the UE, and sends grouping parameter information to the UE.

For example, the eNodeB may equally divide $v_0, v_1, v_2$ and $v_3$ in the codebook model into K1 groups according to the number of sending antennae, and for example, K1 is valued to be 2 if the number of the sending antennae is 16, and K1 is valued to be 4 if the number of the sending antennae is 32; and the basic matrixes in each group obtained by grouping are the same, wherein K1 is an integer more than or equal to 1.

The eNodeB may also equally divide $v_0, v_1, v_2$ and $v_3$ in the model into K1 groups according to a feature of a current channel, and for example, if the current channel is a strongly correlated channel and the channel is strong in correlation, the eNodeB sets a value of K1 to be 1, and at this moment, $v_0\_v_1\_v_2\_v_3$; if the current channel is a relatively strongly correlated channel, the eNodeB sets the value of K1 to be 2, and at this moment, $v_0\_v_1$ and $v_2\_v_3$; and if the current channel is a completely uncorrelated channel, the eNodeB sets the value of K1 to be 4, and the basic matrixes in each group obtained by grouping are the same, wherein K1 is an integer more than or equal to 1.

As shown in FIG. 21, the flow includes the following steps.

Step S2102: the eNodeB sends a CSI-RS to the UE.

Step S2104: the UE receives and measures the CSI-RS sent by the eNodeB, and measures and estimates information of the current channel H by virtue of the CSI-RS.

Step S2106: the eNodeB configures the grouping parameter of the codebook model to the UE.

Step S2108: the UE performs channel quantization according to grouping information of the codebook model configured by the eNodeB.

If the grouping parameter K1 configured by the eNodeB is 2, the UE quantizes information $v_0$ and $v_2$ and $\alpha, \beta$ and $\gamma$ respectively.

Step S2110: the UE feeds back CSI on an uplink channel, that is, the UE feeds back the information $v_0$ and $v_2$ and the information $\alpha, \beta$ and $\gamma$ on the uplink channel.

The eNodeB receives the information $v_0$ and $v_2$ and $\alpha$, $\beta$ and $\gamma$ fed back by the UE, and combines the information to obtain a codebook and the CSI.

Exemplary Embodiment 13

A codebook model stored by an eNodeB and UE in exemplary embodiment 12 may also be:

$W_{r2}=[v'_0 \ \alpha v'_1 \ \beta v'_2 \ \gamma v'_3 \ \lambda v'_4 \ \mu v'_5 \ \kappa v'_6 \ \tau v'_7]^T$.

The eNodeB configures a grouping parameter of basic matrixes in the codebook model to the UE, and sends parameter information to the UE.

For example, the eNodeB may equally divide $v'_0$, $v'_1$, $v'_2$, $v'_3$, $v'_4$, $v'_5$, $v'_6$ and $v'_7$ in the codebook model into K2 groups according to the number of sending antennae, K2 is an integer more than or equal to 1, and for example, K2 is valued to be 4 if the number of the sending antennae is 32, and K2 is valued to be 8 if the number of the sending antennae is 64; and all the basic matrixes in each group obtained by grouping are the same, wherein K2 is an integer more than or equal to 1.

The eNodeB may also equally divide $v'_0$, $v'_1$, $v'_2$, $v'_3$, $v'_4$, $v'_5$, $v'_6$ and $v'_7$ in the codebook model into K2 groups according to a feature of a current channel, and all the basic matrixes in each group obtained by grouping are the same. If the current channel is strongly correlated channel and the channel is strong in correlation, the eNodeB sets a value of K2 to be 1; if the current channel is a relatively strongly correlated channel, the eNodeB sets the value of K2 to be 4; and if the current channel is a completely uncorrelated channel, the eNodeB sets the value of K2 to be 8, and the basic matrixes in each group obtained by grouping are the same, wherein K2 is an integer more than or equal to 1.

The eNodeB sends a CSI-RS to the UE.

The UE receives and measures the CSI-RS sent by the eNodeB, and measures and estimates information of the current channel H by virtue of the CSI-RS.

The UE performs channel quantization according to grouping information of the codebook model configured by the eNodeB, and for example, a grouping condition configured by the eNodeB is K2=4, then the UE quantizes information $v'_0$, $v'_2$, $v'_4$, and $v'_6$ and $\alpha$, $\beta$, $\gamma$, $\lambda$, $\mu$, $\kappa$ and $\tau$ respectively.

The UE feeds back the information $v'_0$, $v'_2$, $v'_4$, and $v'_6$ and the information $\alpha$, $\beta$, $\gamma$, $\lambda$, $\mu$, $\kappa$ and $\tau$ on an uplink channel.

The eNodeB receives the information $v'_0$, $v'_2$, $v'_4$, and $v'_6$ and the information $\alpha$, $\beta$, $\gamma$, $\lambda$, $\mu$, $\kappa$ and $\tau$ fed back by the UE, and combines the information to obtain a codebook and the CSI.

Exemplary Embodiment 14

A codebook model stored by an eNodeB and UE in exemplary embodiment 12 may also be:

$V=\Lambda \cdot [v_0 \ \alpha v_1 \ \beta v_2 \ \gamma v_3]^T$.

A grouping process is the same as that in exemplary embodiment 12.

Exemplary Embodiment 15

A codebook model in exemplary embodiment 13 may also be:

$V=\Lambda \cdot [v'_0 \ \alpha v'_1 \ \beta v'_2 \ \gamma v'_3 \ \lambda v'_4 \ \mu v'_5 \ \kappa v'_6 \ \tau v'_7]^T$, and a grouping condition is the same as that in exemplary embodiment 13.

The eNodeB determines the grouping condition of the codebook model.

For example, the eNodeB may equally divide $v'_0$, $v'_1$, $v'_2$, $v'_3$, $v'_4$, $v'_5$, $v'_6$ and $v'_7$ in the codebook model into K4 groups according to the number of sending antennae, K4 is an integer more than or equal to 1, and for example, K4 is valued to be 4 if the number of the sending antennae is 32, and K4 is valued to be 8 if the number of the sending antennae is 64; and all the basic matrixes in each group obtained by grouping are the same.

The eNodeB may also equally divide $v'_0$, $v'_1$, $v'_2$, $v'_3$, $v'_4$, $v'_5$, $v'_6$ and $v'_7$ in the codebook model into K4 groups according to a feature of a current channel, and all the basic matrixes in each group obtained by grouping are the same. If the current channel is strongly correlated channel and the channel is strong in correlation, the eNodeB sets a value of K4 to be 1; if the current channel is a relatively strongly correlated channel, the eNodeB sets the value of K4 to be 4; and if the current channel is a completely uncorrelated channel, the eNodeB sets the value of K4 to be 8, and the basic matrixes in each group obtained by grouping are the same.

The eNodeB sends grouping information to the UE, and the UE configures grouping of the codebook model after receiving the grouping information sent by the eNodeB, and feeds back information to the eNodeB according to the configuration.

Exemplary Embodiment 16

Figure 22:
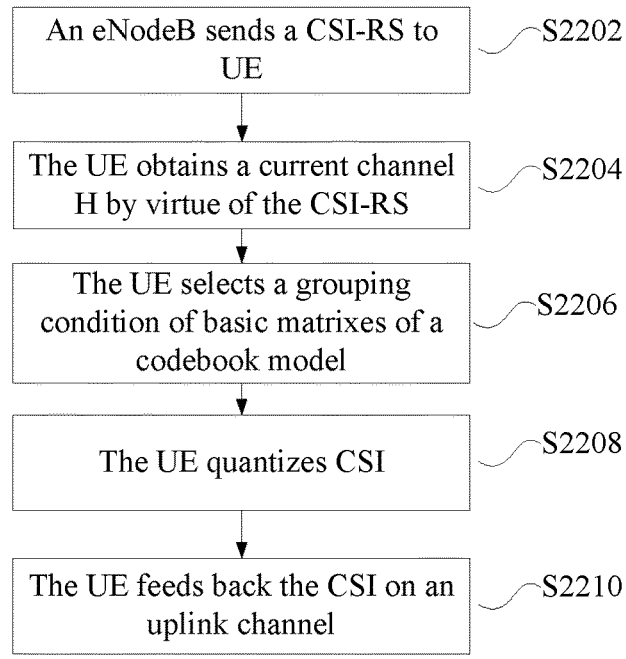
FIG. 22 is a flowchart of exemplary embodiment 16 of the present disclosure.

FIG. 22 is a flowchart of exemplary embodiment 16 of the present disclosure, and it is important to note that an eNodeB and UE store the same precoding codebook model, and the same codebook model may be configured for the UE by the eNodeB, may also be independently selected by the UE, and may further be a set of codebook model stored by both the eNodeB and the UE. The UE may independently select a basic vector grouping condition in the embodiment. If the model stored by both the eNodeB and the UE is $W_{r1}=[v_0 \ \alpha v_1 \ \beta v_2 \ \gamma v_3]^T$, as shown in FIG. 22, the flow includes the following steps.

Step S2202: the eNodeB sends a CSI-RS to the UE.

Step S2204: the UE receives and measures the CSI-RS sent by the eNodeB, and measures and estimates information of a current channel H by virtue of the CSI-RS.

Step S2206: the UE selects a grouping condition of basic matrixes in the model according to the information of the channel H.

The UE may equally divide $v_0$, $v_1$, $v_2$ and $v_3$ in the model into K1 groups according to a feature of the current channel, and for example, if the current channel is a strongly correlated channel and the channel is strong in correlation, the UE sets a value of K1 to be 1, and at this moment, $v_0\_v_1\_v_2\_v_3$; if the current channel is a relatively strongly correlated channel, the UE sets the value of K1 to be 2, and at this moment, $v_0\_v_1$ and $v_2\_v_3$; and if the current channel is a completely uncorrelated channel, the UE sets the value of K1 to be 4.

Step S2208: the UE quantizes CSI according to the selected grouping condition of the basic matrixes in the codebook model.

If K1=1 is selected, the UE performs codebook quantization on $v_0$ to obtain information $v_0$ and information $\alpha$, $\beta$ and $\gamma$ to be reported.

Step S2210: the UE feeds back the CSI on an uplink channel, that is, the UE feeds back K1 information on the uplink channel, and feeds back the information $v_0$ and $\alpha$, $\beta$ and $\gamma$.

The eNodeB receives the K1 information fed back by the UE, receives the information $v_0$ and $\alpha$, $\beta$ and $\gamma$, and combines the information to obtain a codebook and the CSI.

Exemplary Embodiment 17

Like exemplary embodiment 16, a codebook model stored by UE and an eNodeB may also be:

$W_{I2}=[v'_0 \alpha v'_1 \beta v'_2 \gamma v'_3 \lambda v'_4 \mu v'_5 \kappa v'_6 \tau v'_7]^T$.

The UE equally divides $v'_0$, $v'_1$, $v'_2$, $v'_3$, $v'_4$, $v'_5$, $v'_6$ and $v'_7$ into K2 groups according to a condition of a channel, and K2 is a positive integer more than or equal to 1.

Like exemplary embodiment 16, the codebook model stored by the UE and the eNodeB may also be:

$V = \Lambda \cdot [v_0 \alpha v_1 \beta v_2 \gamma v_3]^T$.

The UE equally divides $v_0$, $v_1$, $v_2$ and $v_3$ into K3 groups according to the condition of the channel, and K3 is a positive integer more than or equal to 1.

Like exemplary embodiment 16, the codebook model stored by the UE and the eNodeB may also be:

$V = \Lambda \cdot [v'_0 \alpha v'_1 \beta v'_2 \gamma v'_3 \lambda v'_4 \mu v'_5 \kappa v'_6 \tau v'_7]^T$, the UE equally divides $v'_0$, $v'_1$, $v'_2$, $v'_3$, $v'_4$, $v'_5$, $v'_6$ and $v'_7$ into K4 groups according to the condition of the channel, and K4 is a positive integer more than or equal to 1.

Exemplary Embodiment 18

Like exemplary embodiment 1, parameters $\alpha$, $\beta$ and $\gamma$ of codebook model $W_{I1}=[v_0 \ \alpha v_1 \ \beta v_2 \ \gamma v_3]^T$ stored by an eNodeB and UE form one of the following relationships: $\beta=2\alpha$ and $\gamma=3\alpha$, and $\gamma=\alpha\cdot\eta$.

Exemplary Embodiment 19

According to the method in exemplary embodiment 1, parameters $\alpha$, $\beta$, $\gamma$, $\lambda$, $\mu$, $\kappa$ and $\tau$ of precoding codebook model $W_{I2}=[v'_0 \ \alpha v'_1 \ \beta v'_2 \ \gamma v'_3 \ \lambda v'_4 \ \mu v'_5 \ \kappa v'_6 \ \tau v'_7]^T$ form one of the following relationships: $\beta=2\alpha$, $\gamma=3\alpha$, $\lambda=4\alpha$, $\mu=5\alpha$, $\eta=6\alpha$ and $\tau=7\alpha$; or $\beta=2\alpha$, $\gamma=3\alpha$, $\mu=\lambda\cdot\alpha$, $\kappa=\lambda\cdot\alpha^2$ and $\tau=\lambda\cdot\alpha^3$; or $\lambda=\beta^2$, $\kappa=\beta^3$, $\gamma=\alpha\cdot\beta$, $\mu=\alpha\cdot\beta^2$ and $\mu=\tau\cdot\beta^3$; or $\gamma=\alpha\cdot\beta$, $\mu=\alpha\cdot\lambda$ and $\tau=\alpha\cdot\kappa$; and $\gamma=\alpha\cdot\beta$, $\mu=\alpha\cdot\lambda$ and $\tau=\alpha\cdot\kappa$.

Exemplary Embodiment 20

Figure 23:
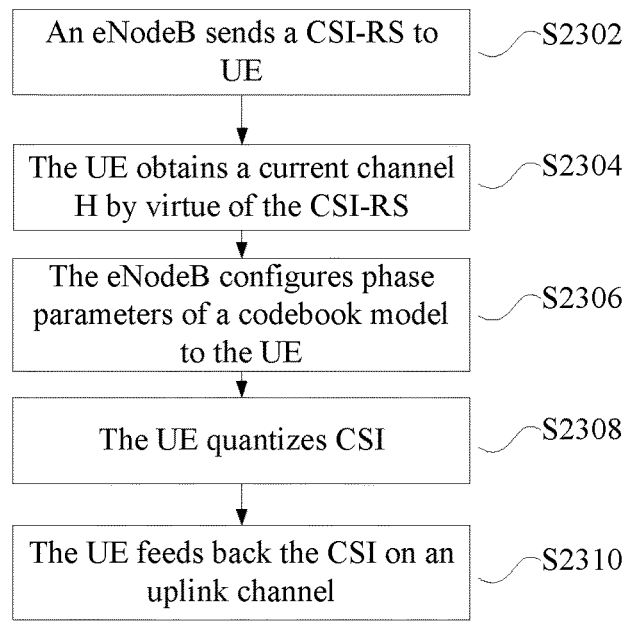
FIG. 23 is a flowchart of exemplary embodiment 20 of the present disclosure.

FIG. 23 is a flowchart of exemplary embodiment 20 of the present disclosure, and as shown in FIG. 20, an eNodeB and UE store the same precoding codebook model respectively, and the same codebook model may be configured for the UE by the eNodeB, may also be independently selected by the UE, and may further be a set of codebook model stored by both the eNodeB and the UE. The eNodeB may configure phase parameters of the codebook model to the UE in the exemplary embodiment. The eNodeB configures the phase parameters in the codebook model to the UE, and sends phase parameter information to the UE. The flow includes the following steps.

Step S2302: the eNodeB sends a CSI-RS to the UE.

Step S2304: the UE receives and measures the CSI-RS sent by the eNodeB, and measures and estimates information of a current channel H by virtue of the CSI-RS.

Step S2306: the eNodeB configures the phase parameters in the codebook model to the UE.

If the codebook model is $W_{I1}=[v_0 \ \alpha v_1 \ \beta v_2 \ \gamma v_3]^T$, Table 17 is a table of a relationship between a phase parameter relationship index and a phase parameter relationship according to exemplary embodiment 20 of the present disclosure, and as shown in Table 17, the phase parameter relationship may be:

TABLE 17

| Phase parameter relationship index | Phase parameter relationship |
|---|---|
| 0 | $\alpha$ is independently reported, $\beta = 2\alpha$ and $\gamma = 3\alpha$ |
| 1 | $\alpha$ and $\beta$ are independently reported, and $\gamma = \alpha \cdot \beta$ |
| 2 | $\alpha$, $\beta$ and $\gamma$ are independently reported |
| 3 | $\alpha = f(v_0)$, $\beta = f(v_1, \alpha)$ and $\gamma = f(v_2, \alpha, \beta)$ |

In the embodiment, when index is 3, $v_0$, $v_1$, $v_2$ and $v_3$ are DFT vectors, and $v_i = [1 \ e^{j\Theta_i} \ \ldots \ e^{j(n-1)\Theta_i}]$ i=0,1,2,3 where n is the number of elements in a DFT vector; and $\alpha = e^{jn\Theta_0}$, $\beta = \alpha \cdot e^{jn\Theta_1}$ and $\gamma = \beta \cdot e^{jn\Theta_2}$.

Step S2308: the UE quantizes CSI, and if the eNodeB configures phase parameter relationship 3 to the UE, the UE performs channel quantization as much as possible according to the configured phase parameter relationship of the codebook model, and the UE quantizes information $v_0$, $v_1$, $v_2$ and $v_3$ respectively.

Step S2310: the UE feeds back the CSI on an uplink channel, that is, the UE feeds back the information $v_0$, $v_1$, $v_2$ and $v_3$ on the uplink channel.

The eNodeB receives the information $v_0$, $v_1$, $v_2$ and $v_3$ fed back by the UE, and combines the information to obtain a codebook and the CSI.

A codebook model obtained by multiplying any non-zero complex number by the precoding codebook model in the embodiment is equivalent to the untransformed codebook model.

By the abovementioned embodiments and exemplary implementation modes, codebook model $W_{I1}=[v_0 \ \alpha v_1 \ \beta v_2 \ \gamma v_3]^T$, $W_{I2}=[v'_0 \ \alpha v'_1 \ \beta v'_2 \ \gamma v'_3 \ \lambda v'_4 \ \mu v'_5 \ \kappa v'_6 \ \tau v'_7]^T$, $W_{IJ1}=\Lambda \cdot [v_0 \ \alpha v_1 \ \beta v_2 \ \gamma v_3]^T$, or $W_{IJ2}=\Lambda \cdot [v'_0 \ \alpha v'_1 \ \beta v'_2 \ \gamma v'_3 \ \lambda v'_4 \mu v'_5 \ \kappa v'_6 \ \tau v'_7]$ may avoid the UE or the eNodeB storing massive long codebooks, such as a 32-antenna codebook, and the UE is only required to store an existing 4-antenna codebook and 8-antenna codebook.

During codebook selection, the UE is also not required to perform large-scale codebook traversing selection, and is only required to perform matching in small groups, so that higher codebook selection speed may be ensured.

During uplink feedback of the UE, feedback with a codebook model may reduce overhead and improve performance. Particularly by codebook models $W_{IJ1}=\Lambda \cdot [v_0 \ \alpha v_1 \ \beta v_2 \ \gamma v_3]^T$ and $W_{IJ2}=\Lambda \cdot [v'_0 \ \alpha v'_1 \ \beta v'_2 \ \gamma v'_3 \ \lambda v'_4 \ \mu v'_5 \ \kappa v'_6 \ \tau v'_7]$, code words of a non-constant norm are increased, and a matching degree of a code word and a feature vector of a channel may be remarkably improved without excessive overhead.

The eNodeB configures the codebook model to the UE or the UE selects the codebook model according to the condition of the channel, so that the UE may select code words more flexibly, and may select the most proper code word for reporting according to the condition of the channel. For example, in case of strongly correlated channel, the basic matrixes in the model may be selected to be all equal, for example, $v_0 \ v_1 \ v_2 \ v_3$ or $v'_0 \ v'_1 \ v'_2 \ v'_3 \ v'_4 \ v'_5 \ v'_6 \ v'_7$, so that overhead may be greatly reduced without influence on system performance.

The basic matrixes in the codebook model are grouped or the phase parameter relationship is fixed, and the eNodeB and the UE may select the most proper code word according to the condition of the channel, so that higher system performance may be achieved, and meanwhile, overhead may be greatly reduced.

Figure 24:
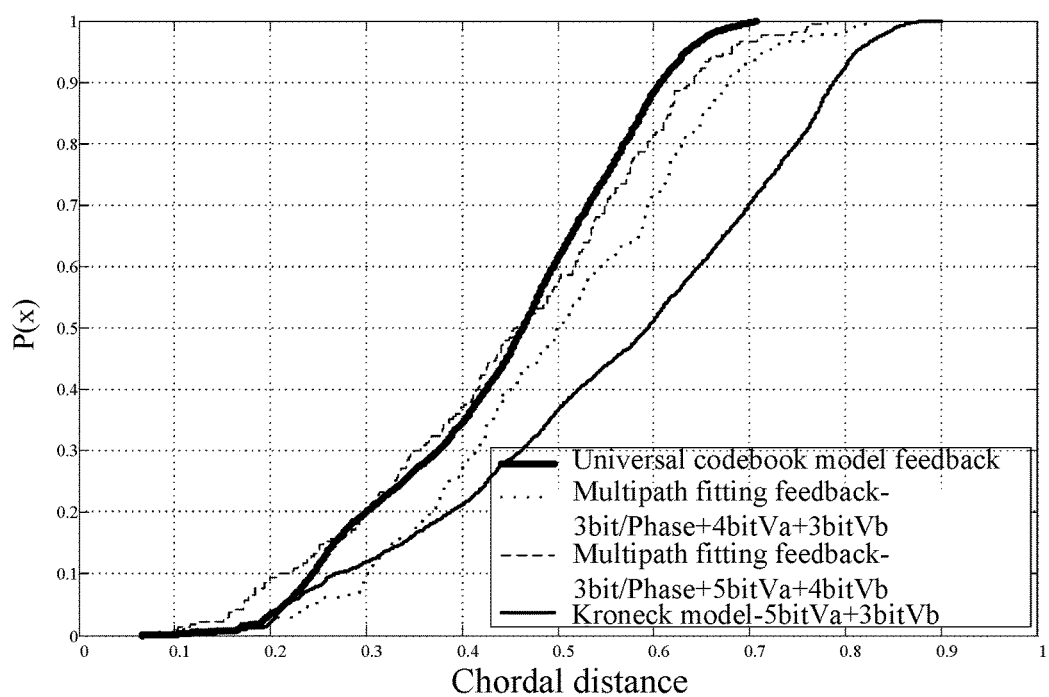
FIG. 24 is a chart of a Cumulative Distribution Function (CDF) simulation curve of a codebook and channel matching chordal distance according to an exemplary embodiment of the present disclosure.

Since a PUCCH and a PUSCH have different information bearing capabilities and the PUCCH may bear 11-bit information only, requirements on information fed back by the PUSCH and the PUCCH are different. When the PUCCH is adopted to feed back codebook model and code word information, low overhead is required, and if the PUSCH is adopted to feed back the information, high performance and maximal reduction in overhead are required. Therefore, during feedback on the PUCCH and the PUSCH, basic vectors of a codebook model are required to be distinctively grouped according to different channels. FIG. 24 is a chart of a CDF simulation curve of a codebook and channel matching chordal distance according to an exemplary embodiment of the present disclosure. As shown in FIG. 24, matching degrees between codebooks of different models and a feature vector of a channel are different, the channel in simulation is a 32-sender 8-receiver channel, and an antenna topology on a sending side is 16*2. The light blue line in the figure represents a codebook of a Kroneck product form, New Model in the figure represents a codebook of model $W_{IJ1} = \Lambda \cdot [v_0 \ \alpha v_1 \ \beta v_2 \ \gamma v_3]^T$, and from the figure, it can be seen that only 10 bits or 12 bits are adopted to quantize $\Lambda$, and performance is higher than that of a codebook of a Kroneck form. When code word overhead with adoption of codebook model $W_{I2} = [v'_0 \ \alpha v'_1 \ \beta v'_2 \ \gamma v'_3 \ \lambda v'_4 \ \mu v'_5 \ \kappa v'_6 \ \tau v'_7]^T$ is 68 bits, the codebook performance is optimal in the model, and the code word is most matched with the feature vector of the channel.

Obviously, those skilled in the art should know that each module or step of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the present disclosure is not limited to any specific hardware and software combination.

The above is only the exemplary embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection of the present disclosure.

INDUSTRIAL APPLICABILITY

As mentioned above, by the embodiments and the exemplary implementation modes, the problems of difficulty in code word selection and increase of link overhead during application of a codebook-based CSI feedback manner to Massive MIMO in the related technology are solved, and the effect of reducing codebook transmission overhead is further achieved.

What is claimed is:

1. A method for processing Channel State Information (CSI), comprising:
    storing one or more sets of precoding codebook models which is the same as one or more sets of precoding codebook models stored at an Evolved Node B (eNodeB);
    determining a precoding codebook model for feeding back CSI; and
    sending the CSI to the eNodeB by adopting the determined precoding codebook model;
    wherein sending the CSI to the eNodeB by adopting the determined precoding codebook model comprises:
    determining codebook feedback accuracy for feeding back the CSI from stored feedback accuracy level information which is the same as feedback accuracy level information stored at the eNodeB; and sending the CSI to the eNodeB by adopting the determined precoding codebook model and the determined codebook feedback accuracy;
    or,
    quantizing the CSI by adopting the determined precoding codebook model; and sending codebook index information used for identifying the precoding codebook model and a phase parameter, corresponding to the precoding codebook model, obtained by quantization to the evolved Node B;
    or,
    determining number of feedback parameters for feeding back the CSI from level information of the number of feedback parameters which is the same as level information of the number of feedback parameters which is stored at the eNodeB; and sending the CSI to the eNodeB by adopting the determined precoding codebook model and the determined number of feedback parameters.

2. The method as claimed in claim 1, wherein determining the precoding codebook model for feeding back the CSI comprises at least one of:
    selecting the precoding codebook model for feeding back the CSI from the one or more sets of precoding codebook models according to a detection result obtained by detection on a current channel; and
    determining a precoding codebook model configured by the eNodeB as the precoding codebook model for feeding back the CSI.

3. The method as claimed in claim 1, wherein the precoding codebook model comprises at least one of:
    $W_{f1} = [v_0 \ \alpha v_1 \ \beta v_2 \ \gamma v_3]^T$, or $W_{f2} = [v_0' \ \alpha v_1' \ \beta v_2' \ \gamma v_3' \ \lambda v_4' \ \mu v_5' \ \kappa v_6' \ \tau v_7']^T$ identified by a first type of codebook index;
    $W_{IJ1} = \Lambda \cdot [v_0 \ \alpha v_1 \ \beta v_2 \ \gamma v_3]^T$ or $W_{IJ2} = \Lambda \cdot [v_0' \ \alpha v_1' \ \beta v_2' \ \gamma v_3' \ \lambda v_4' \ \mu v_5' \ \kappa v_6' \ \tau v_7']$ identified by both the first type of codebook index and a second type of codebook index, wherein basic matrices $v_0$, $v_1$, $v_2$ and $v_3$ are all $v \times (N_t/4)$-dimensional matrices, basic matrices $v_0'$, $v_1'$, $v_2'$, $v_3'$, $v_4'$, $v_5'$, $v_6'$ are all $v \times (N_t/8)$-dimensional matrices, $\alpha$, $\beta$, $\gamma$, $\lambda$, $\mu$, $\kappa$ and $\tau$ are phase parameters, and are complex numbers, and $N_t$ is a total number of antennae, and is an integer more than or equal to 16; and $v$ represents a total number of layers, and is a positive integer more than or equal to 1 and less than or equal to $N_t$, $\Lambda$ is a diagonal matrix and not all element amplitudes are the same.

4. The method as claimed in claim 3, wherein at least one of the following conditions is met:
    basic matrixes $v_0$, $v_1$, $v_2$ and $v_3$ are the same; and
    basic matrixes $v_0'$, $v_1'$, $v_2'$, $v_3'$, $v_5'$, $v_6'$ and $v_7'$ are the same.

5. The method as claimed in claim 3, wherein at least one of the following conditions is met:
    for precoding codebook model $W_{f1} = [v_0 \ \alpha v_1 \ \beta v_2 \ \gamma v_3]^T$, basic matrixes $v_0$, $v_1$, $v_2$ and $v_3$ are equally divided into K1 groups, and the basic matrixes in each group are the same;
    for precoding codebook model $W_{f2} = [v_0' \ \alpha v_1' \ \beta v_2' \ \gamma v_3' \ \lambda v_4' \ \mu v_5' \ \kappa v_6' \ \tau v_7']^T$, basic matrixes $v_0'$, $v_1'$, $v_2'$, $v_3'$, $v_4'$, $v_5'$, $v_6'$, and $v_7'$ are equally divided into K2 groups, and the basic matrixes in each group are the same;

for precoding codebook model $W_{L/1}=\Lambda \cdot [v_0 \; \alpha v_1 \; \beta v_2 \; \gamma v_3]^T$, basic matrixes $v_0$, $v_1$, $v_2$ and $v_3$ are equally divided into K3 groups, and the basic matrixes in each group are the same; and for precoding codebook model $W_{L/2}=\Lambda \cdot [v_0' \; \alpha v_1' \; \beta v_2' \; \gamma v_3' \; \lambda v_4' \; \mu v_5' \; \kappa v_6' \; \tau v_7']$, basic matrixes $v_0'$, $v_1'$, $v_2'$, $v_3'$, $v_4'$, $v_5'$, $v_6'$ and $v_7'$ are equally divided into K4 groups, and the basic matrixes in each group are the same, wherein K1, K2, K3 and K4 are all positive integers more than or equal to 1.

6. The method as claimed in claim 3, wherein
the diagonal matrix $\Lambda$ is used for changing amplitudes and phases of ports of $N_t$ antennae;

or, $\Lambda = I \pm A$, wherein the second type of codebook index is used for indicating A information, I is a unit matrix and A is any complex matrix.

7. The method as claimed in claim 3, wherein at least one of the following conditions is met:

for precoding codebook model $W_{1f}=[v_0 \; \alpha v_1 \; \beta v_2 \; \gamma v_3]^T$, phase parameters $\alpha$, $\beta$ and $\gamma$ form one of the following relationships: $\beta=2\alpha$ and $\gamma=3\alpha$; and $\gamma=\alpha \cdot \beta$; and for precoding codebook model $W_{f2}=[v_0' \; \alpha v_1' \; \beta v_2' \; \gamma v_3' \; \lambda v_4' \; \mu v_5' \; \kappa v_6' \; \tau v_7']^T$, $\alpha$, $\beta$, $\gamma$, $\lambda$, $\mu$, $\kappa$ and $\tau$ form one of the following relationships: $\beta=2\alpha$, $\gamma=3\alpha$, $\lambda=4\alpha$, $\mu=5\alpha$, $\kappa=6\alpha$, and $\tau=7\alpha$; $\beta=2\alpha$, $\gamma=3\alpha$, $\mu=\lambda \cdot \alpha$, $\kappa=\lambda \cdot \alpha^2$ and $\tau=\lambda \cdot \alpha^3$; $\lambda=\beta^2$, $\kappa=\beta^3$, $\gamma=\alpha \cdot \beta$, $\mu=\alpha \cdot \beta^2$ and $\mu=\tau \cdot \beta^3$; $\gamma=\alpha \cdot \beta$, $\mu=\alpha \cdot \lambda$ and $\tau=\alpha \cdot \kappa$; and $\gamma=\alpha \cdot \beta$, $\mu=\alpha \cdot \lambda$ and $\tau=\alpha \cdot \kappa$.

8. The method as claimed in claim 3, wherein the first type of codebook index comprises at least one of the following forms:

i, wherein i is a positive integer more than or equal to 1, and is used for simultaneously identifying the basic matrixes and phase parameters of the precoding codebook model;

i1,i2, wherein i1 and i2 are positive integers more than or equal to 1, i1 is used for identifying the basic matrix of the precoding codebook model, and i2 is used for identifying the phase parameter of the precoding codebook model; and i1, i2, i3, wherein i1, i2 and i3 are positive integers more than or equal to 1, i1 and i2 are used for identifying the basic matrix of the precoding codebook model, and i3 is used for identifying the phase parameter of the precoding codebook model.

9. The method as claimed in claim 5, wherein User Equipment (UE) independently selects grouping parameters K1, K2, K3 or K4 of the precoding codebook model according to a Physical Uplink Shared Channel (PUSCH) and a Physical Uplink Control Channel (PUCCH).

10. A method for processing Channel State Information (CSI), comprising:

storing one or more sets of precoding codebook models which is the same as one or more sets of precoding codebook models stored at User Equipment (UE); and receiving CSI sent by adopting a precoding codebook model for feeding back the CSI from the UE;

before receiving the CSI sent by adopting the precoding codebook model for feeding back the CSI from the UE, the method further comprising:

sending first indication information to the UE, wherein the first indication information is used for indicating the precoding codebook model for feeding back the CSI by the UE;

or, sending second indication information to the UE, wherein the second indication information is used for indicating codebook feedback accuracy for feeding back the CSI by the UE;

or, sending third indication information to the UE, wherein the third indication information is used for indicating number of feedback parameters for feeding back the CSI by the UE.

11. The method as claimed in claim 10, wherein the precoding codebook model comprises at least one of:

$W_{f1}=[v_0 \alpha v \beta v_2 \gamma v_3]^T$ or $W_{f2}=[v_0' \; \alpha v_1' \; \beta v_2' \; \gamma v_3' \; \mu v_5' \; \kappa v_6' \; \tau v_7']^T$ identified by a first type of codebook index;

$W_{L/1}=\Lambda \cdot [v_0 \; \alpha v_1 \; \beta v_2 \; \gamma v_3]^T$ or $W_{L/2}=\Lambda \cdot [v_0' \; \alpha v_1' \; \beta v_2' \; \gamma v_3' \; \lambda v_4' \; \mu v_5' \; \kappa v_6' \; \tau v_7']$ identified by both the first type of codebook index and a second type of codebook index, wherein basic matrixes matrices $v_0$, $v_1$, $v_2$ and $v_3$ are all $v \times (N_t/4)$-dimensional matrixes, basic matrices $v_0'$, $v_1'$, $v_2'$, $v_3'$, $v_4'$, $v_5'$, $v_6'$, and $v_7'$ are all $v \times (N_t/8)$-dimensional matrices, $\alpha$, $\beta$, $\gamma$, $\lambda$, $\mu$, $\kappa$ and $\tau$ are phase parameters, and are complex numbers, and $N_t$ is a total number of antennae, and is an integer more than or equal to 16; and $v$ represents a total number of layers, and is a positive integer more than or equal to 1 and less than or equal to $N_t$, $\Lambda$ is a diagonal matrix and not all element amplitudes are the same.

12. The method as claimed in claim 11, wherein at least one of the following conditions is met:

basic matrices $v_0$, $v_1$, $v_2$ and $v_3$ are the same; and basic matrixes $v_0'$, $v_1'$, $v_2'$, $v_3'$, $v_4'$, $v_5'$, $v_6'$, and $v_7'$ are the same.

13. The method as claimed in claim 11, wherein at least one of the following conditions is met:

for precoding codebook model $W_{1f}=[v_0 \; \alpha v_1 \; \beta v_2 \; \gamma v_3]^T$, basic matrices $v_0$, $v_1$, $v_2$ and $v_3$ are equally divided into K1 groups, and the basic matrices in each group are the same;

for precoding codebook model $W_{f2}=[v_0' \; \alpha v_1' \; \beta v_2' \; \gamma v_3' \; \lambda v_4' \; \mu v_5' \; \kappa v_6' \; \tau v_7']^T$, basic matrices $v_0'$, $v_1'$, $v_2'$, $v_3'$, $v_5'$, $v_6'$ and $v_7'$ are equally divided into K2 groups, and the basic matrices in each group are the same;

for precoding codebook model $W_{L/1}=\Lambda \cdot [v_0 \; \alpha v_1 \; \beta v_2 \; \gamma v_3]^T$, basic matrices $v_0$, $v_1$, $v_2$ and $v_3$ are equally divided into K3 groups, and the basic matrices in each group are the same; and for precoding codebook model $W_{L/2}=\Lambda \cdot [v_0' \; \alpha v_1' \; \beta v_2' \; \gamma v_3' \; \lambda v_4' \; \mu v_5' \; \kappa v_6' \; \tau v_7']$, basic matrices $v_0'$, $v_1'$, $v_2'$, $v_3'$, $v_4'$, $v_5'$, $v_6'$, $v_7'$ are equally divided into K4 groups, and the basic matrices in each group are the same, wherein K1, K2, K3 and K4 are all positive integers more than or equal to 1.

14. The method as claimed in claim 13, wherein
the diagonal matrix $\Lambda$ is used for changing amplitudes and phases of ports of $N_t$ antennae;

or, $\Lambda=I+A$, wherein the second type of codebook index is used for indicating A information, I is a unit matrix and A is any complex matrix.

15. The method as claimed in claim 11, wherein at least one of the following conditions is met:

for precoding codebook model $W_{f1}=[v_0 \; \alpha v_1 \; \beta v_2 \; \gamma v_3]^T$, phase parameters $\alpha$, $\beta$ and $\gamma$ form one of the following relationships: $\beta=2\alpha$ and $\gamma=3\alpha$; and $\gamma=\alpha \cdot \beta$; and for precoding codebook model $W_{f2}=[v_0' \; \alpha v_1' \; \beta v_2' \; \gamma v_3' \; \lambda v_4' \; \mu v_5' \; \kappa v_6' \; \tau v_7']^T$, $\alpha$, $\beta$, $\gamma$, $\lambda$, $\mu$, $\kappa$ and $\tau$ form one of the following relationships: $\beta=2\alpha$, $\gamma=3\alpha$, $\lambda=4\alpha$, $\mu=5\alpha$, $\kappa=6\alpha$ and $\tau=7\alpha$; $\beta=2\alpha$, $\gamma=3\alpha$, $\mu=\lambda \cdot \alpha$, $\kappa=\lambda \alpha^2$ and $\tau=\lambda\cdot\alpha^3$; $\lambda=\beta^2$, $\kappa=\beta^3$, $\gamma=\alpha\cdot\beta$, $\mu=\alpha\cdot\beta^2$ and $\mu=\tau\cdot\beta^3$; $\gamma=\alpha\cdot\beta$, $\mu=\alpha\cdot\lambda$ and $\tau=\alpha\cdot\kappa$; $\gamma=\alpha\cdot\beta$, $\mu=\alpha\cdot\lambda$ and $\tau=\alpha\cdot\kappa$.

16. The method as claimed in claim 11, wherein the first type of codebook index comprises at least one of the following forms:
i, wherein i is a positive integer more than or equal to 1, and is used for simultaneously identifying the basic matrices and phase parameters of the precoding codebook model;
i1, i2, wherein i1 and i2 are positive integers more than or equal to 1, i1 is used for identifying the basic matrix of the precoding codebook model, and i2 is used for identifying the phase parameter of the precoding codebook model; and
i1, i2, i3, wherein i1, i2 and i3 are positive integers more than or equal to 1, i1 and i2 are used for identifying the basic matrix of the precoding codebook model, and i3 is used for identifying the phase parameter of the precoding codebook model.

17. The method as claimed in claim 13, wherein grouping parameters K1, K2, K3 or K4 is configured for the UE by an Evolved Node B (eNodeB) in a signaling configuration manner.

18. The method as claimed in claim 13, wherein the eNodeB configures grouping parameters K1, K2, K3 or K4 for the UE according to the number of sending antennae.

19. The method as claimed in claim 13, wherein the eNodeB independently configures, for the UE, information of grouping parameters K1, K2, K3 or K4 of the precoding codebook model on a Physical Uplink Control Channel (PUCCH) and a Physical Uplink Shared Channel (PUSCH) to the UE.

20. The method as claimed in claim 10, after receiving the CSI sent by adopting the precoding codebook model for feeding back the CSI from the UE, the method further comprising:
scheduling, for the UE, a downlink transmission mode corresponding to the UE according to a codebook corresponding to the precoding codebook model for feeding back the CSI, wherein the downlink transmission mode comprises at least one of: a Single-User Multi-input Multi-output (SU-MIMO) transmission mode, a Multi-User MIMO (MU-MIMO) transmission mode, a single-user dynamic handover transmission mode, a multi-user dynamic handover transmission mode and a coordinated multi-point transmission mode.

21. A device for processing Channel State Information (CSI), comprising:
a first storage module, configured to store one or more sets of precoding codebook models which is the same as one or more sets of precoding codebook models stored at an Evolved Node B (eNodeB);
a first determination module, configured to determine a precoding codebook model for feeding back CSI; and
a first sending module, configured to send the CSI to the eNodeB by adopting the determined precoding codebook model;
wherein the first sending module comprises:
a second determination unit, configured to determine codebook feedback accuracy for feeding back the CSI from stored feedback accuracy level information which is the same as feedback accuracy level information stored at the eNodeB; and a first sending unit, configured to send the CSI to the eNodeB by adopting the determined precoding codebook model and the determined codebook feedback accuracy;
or,
a first quantization unit, configured to quantize the CSI by adopting the determined precoding codebook model;
and a second sending unit, configured to send codebook index information used for identifying the precoding codebook model and a phase parameter, corresponding to the precoding codebook model, obtained by quantization to the evolved Node B;
or,
a third determination unit, configured to determine number of feedback parameters for feeding back the CSI from level information of the number of feedback parameters which is the same as level information of the number of feedback parameters which is stored at the eNodeB; and a second sending unit, configured to send the CSI to the eNodeB by adopting the determined precoding codebook model and the determined number of feedback parameters.

22. The device as claimed in claim 21, wherein first determination module comprises at least one of:
a first selection unit, configured to select the precoding codebook model for feeding back the CSI from the one or more sets of precoding codebook models according to a detection result obtained by detection on a current channel; and
a first determination unit, configured to determine a precoding codebook model configured by the eNodeB as the precoding codebook model for feeding back the CSI.

23. The device as claimed in claim 21, wherein the precoding codebook model comprises at least one of:
$W_{f1}=[v_0 \ \alpha v_1 \ \beta v_2 \ \gamma v_3]^T$ or $W_{f2}=[v_0' \ \alpha v_1' \ \beta v_2' \ \gamma v_3' \ \lambda v_4' \ \mu v_5' \ \kappa v_6' \ \tau v_7']^T$ identified by a first type of codebook index;
$W_{f/1}=\Lambda\cdot[v_0 \ \alpha v_1 \ \beta v_2 \ \gamma v_3]^T$ or $W_{f/2}=\Lambda\cdot[v_0' \ \alpha v_1' \ \beta v_2' \ \gamma v_3' \ \lambda v_4' \ \mu v_5' \ \kappa v_6' \ \tau v_7']$ identified by both the first type of codebook index and a second type of codebook index, wherein basic matrixes matrices $v_0$, $v_1$, $v_2$ and $v_3$ are all $v\times(N_t/4)$-dimensional matrices, basic matrices $v_0'$, $v_1'$, $v_2'$, $v_3'$, $v_4'$, $v_5'$, $v_6'$ and $v_7'$ are all $v\times(N_t/8)$-dimensional matrices, $\alpha$, $\beta$, $\gamma$, $\lambda$, $\mu$, $\kappa$ and $\tau$ are phase parameters, and are complex numbers, and $N_t$ is a total number of antennae, and is an integer more than or equal to 16; and v represents a total number of layers, and is a positive integer more than or equal to 1 and less than or equal to $N_t$, $\Lambda$ is a diagonal matrix and not all element amplitudes are the same.

24. A User Equipment (UE), comprising: the device as claimed in claim 21.

25. A device for processing Channel State Information (CSI), comprising:
a first storage module, configured to store one or more sets of precoding codebook models the same as one or more sets of precoding codebook models stored at User Equipment (UE); and
a first receiving module, configured to receive CSI sent by adopting a precoding codebook model for feeding back the CSI from the UE;
further comprising:
a first sending module, configured to send first indication information to the UE, wherein the first indication information is used for indicating the precoding codebook model for feeding back the CSI by the UE;
or,
a second sending module, configured to send second indication information to the UE, wherein the second indication information is used for indicating codebook feedback accuracy for feeding back the CSI by the UE;
or,
a third sending module, configured to send third indication information to the UE, wherein the third indication information is used for indicating number of feedback parameters for feeding back the CSI by the UE.

26. The device as claimed in claim 25, wherein the precoding codebook model comprises at least one of:

$W_{J1}=[v_0\ \alpha v_1\ \beta v_2\ \gamma v_3]^T$ or $W_{J2}=[v_0'\ \alpha v_1'\ \beta v_2'\ \gamma v_3'\ \lambda v_4'\ \mu v_5'\ \kappa v_6'\ \tau v_7']^T$ identified by a first type of codebook index;

$W_{IJ1}=\Lambda\cdot[v_0\ \alpha v_1\ \beta v_2\ \gamma v_3]^T$ or $W_{I,J2}=\Lambda\cdot[v_0'\ \alpha v_1'\ \beta v_2'\ \gamma v_3'\ \lambda v_4'\ \mu v_5'\ \kappa v_6'\ \tau v_7']$ identified by both the first type of codebook index and a second type of codebook index, wherein basic matrices $v_0$, $v_1$, $v_2$ and $v_3$ are all $v\times(N_t/4)$-dimensional matrices, basic matrices $v_0'$, $v_1'$, $v_2'$, $v_3'$, $v_4'$, $v_5'$, $v_6'$ and $v_7'$ are all $v\times(N_t/8)$-dimensional matrices, $\alpha$, $\beta$, $\gamma$, $\lambda$, $\mu$, $\kappa$ and $\tau$ are phase parameters, and are complex numbers, and $N_t$ is a total number of antennae, and is an integer more than or equal to 16; and $v$ represents a total number of layers, and is a positive integer more than or equal to 1 and less than or equal to $N_t$, $\Lambda$ is a diagonal matrix and not all element amplitudes are the same.

27. The device as claimed in claim 25, further comprising:
a scheduling module, configured to schedule, for the UE, a downlink transmission mode corresponding to the UE according to a codebook corresponding to the precoding codebook model for feeding back the CSI, wherein the downlink transmission mode comprises at least one of: a Single-User Multi-input Multi-output (SU-MIMO) transmission mode, a Multi-User MIMO (MU-MIMO) transmission mode, a single-user dynamic handover transmission mode, a multi-user dynamic handover transmission mode and a coordinated multipoint transmission mode.

28. An Evolved Node B (eNodeB), comprising the device as claimed in claim 25.

* * * * *